(12) United States Patent
Nagaoka et al.

(10) Patent No.: US 11,149,473 B2
(45) Date of Patent: Oct. 19, 2021

(54) DOOR CLOSING DEVICE

(71) Applicant: MITSUI KINZOKU ACT CORPORATION, Yokohama (JP)

(72) Inventors: Tomoharu Nagaoka, Yokohama (JP); Hideaki Nozawa, Yokohama (JP)

(73) Assignee: MITSUI KINZOKU ACT CORPORATION, Yokohama (JP)

( * ) Notice: Subject to any disclaimer, the term of this patent is extended or adjusted under 35 U.S.C. 154(b) by 542 days.

(21) Appl. No.: 16/096,253

(22) PCT Filed: Apr. 25, 2016

(86) PCT No.: PCT/JP2016/062948
§ 371 (c)(1),
(2) Date: Oct. 24, 2018

(87) PCT Pub. No.: WO2017/187489
PCT Pub. Date: Nov. 2, 2017

(65) Prior Publication Data
US 2019/0136588 A1 May 9, 2019

(51) Int. Cl.
*E05B 81/20* (2014.01)
*E05B 79/08* (2014.01)
(Continued)

(52) U.S. Cl.
CPC .............. *E05B 81/20* (2013.01); *B60J 5/00* (2013.01); *B60J 5/04* (2013.01); *E05B 53/00* (2013.01);
(Continued)

(58) Field of Classification Search
CPC .......... E05B 81/20; E05B 79/20; E05B 79/08; E05B 17/0029; E05B 81/00; E05B 81/04;
(Continued)

(56) References Cited

U.S. PATENT DOCUMENTS 4,995,653 A  2/1991 Torii
5,921,612 A  7/1999 Mizuki et al.
(Continued)

FOREIGN PATENT DOCUMENTS

CN  1108730 A  9/1995
CN  1122869 A  5/1996
(Continued)

OTHER PUBLICATIONS

Chinese Office Action dated Dec. 4, 2019 for corresponding Application No. 201680084910.X.
(Continued)

*Primary Examiner* — Kristina R Fulton
*Assistant Examiner* — Emily G. Brown
(74) *Attorney, Agent, or Firm* — Foley & Lardner LLP

(57) ABSTRACT

A door closing apparatus includes a latching mechanism including a latch, a closing mechanism configured to shift the latching mechanism from a half latching state to a fully latching state, and a driving source configured to operate the closing mechanism. The closing mechanism includes a closing lever that is rotated by power of the driving source, a closing arm that is translated in response to a rotation of the closing lever to be linked with the latch and a cancelling lever that rotates in response to an operation of a door opening operation source. The closing lever has a closing lever shaft that is supported by the cancelling lever, and the supporting of the closing lever shaft by the cancelling lever is cancelled by a rotation of the cancelling lever in response to an operation of the door opening operation source.

5 Claims, 27 Drawing Sheets

(51) Int. Cl.
  *E05B 53/00* (2006.01)
  *B60J 5/00* (2006.01)
  *B60J 5/04* (2006.01)
  *E05B 79/20* (2014.01)
(52) U.S. Cl.
  CPC .............. *E05B 79/08* (2013.01); *E05B 79/20* (2013.01); *E05Y 2900/531* (2013.01)
(58) Field of Classification Search
  CPC .................. B60J 5/04; E05Y 2900/531; Y10T 292/1047; Y10T 292/1082; Y10S 292/23
  See application file for complete search history.

(56) References Cited

U.S. PATENT DOCUMENTS

| | | | | |
|---|---|---|---|---|
| 6,131,337 | A | * | 10/2000 | Machida ................. E05B 81/20 |
| | | | | 292/201 |
| 6,390,516 | B1 | | 5/2002 | Kobayashi |
| 6,669,247 | B2 | * | 12/2003 | Swan ...................... E05B 81/14 |
| | | | | 292/201 |
| 9,163,434 | B2 | * | 10/2015 | Uehara ................... E05B 77/26 |
| 2006/0202485 | A1 | | 9/2006 | Yamamoto et al. |
| 2006/0267351 | A1 | | 11/2006 | Spurr |
| 2008/0022736 | A1 | * | 1/2008 | Kouzuma ............... E05B 81/20 |
| | | | | 70/237 |
| 2008/0203737 | A1 | | 8/2008 | Tomaszewski et al. |
| 2016/0002959 | A1 | | 1/2016 | Javadzadeh et al. |
| 2016/0153215 | A1 | | 6/2016 | Tomaszewski et al. |
| 2017/0298662 | A1 | * | 10/2017 | Shibayama ............. E05B 81/20 |

FOREIGN PATENT DOCUMENTS

| | | |
|---|---|---|
| CN | 1858387 A | 11/2006 |
| CN | 101184900 A | 5/2008 |
| CN | 204081742 U | 1/2015 |
| CN | 105121765 A | 12/2015 |
| DE | 40 09 277 A | 9/1990 |
| JP | H11-324450 A | 11/1999 |
| JP | 2001355362 A | 12/2001 |
| JP | 3574335 B2 | 7/2004 |
| JP | 2007138603 A | 6/2007 |
| JP | 2007216912 A | 8/2007 |
| JP | 4092770 B2 | 5/2008 |
| WO | WO-00/011290 A | 3/2000 |

OTHER PUBLICATIONS

Extended European Search Report dated Nov. 25, 2019 for corresponding Application No. 16900362.1.
International Search Report for PCT/JP2016/062948 dated Jul. 21, 2018.

* cited by examiner

[FIG. 1]
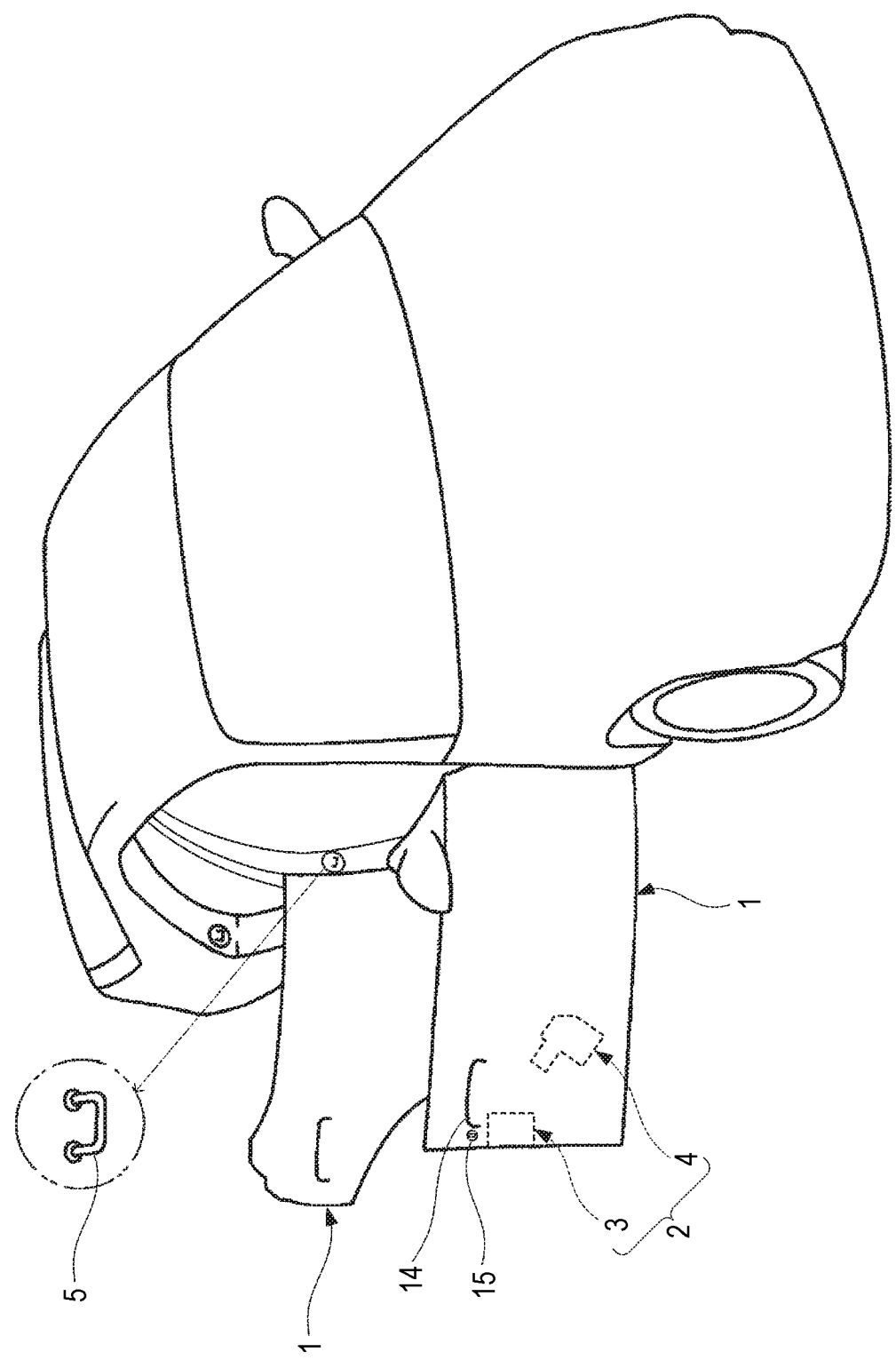

[FIG. 2]
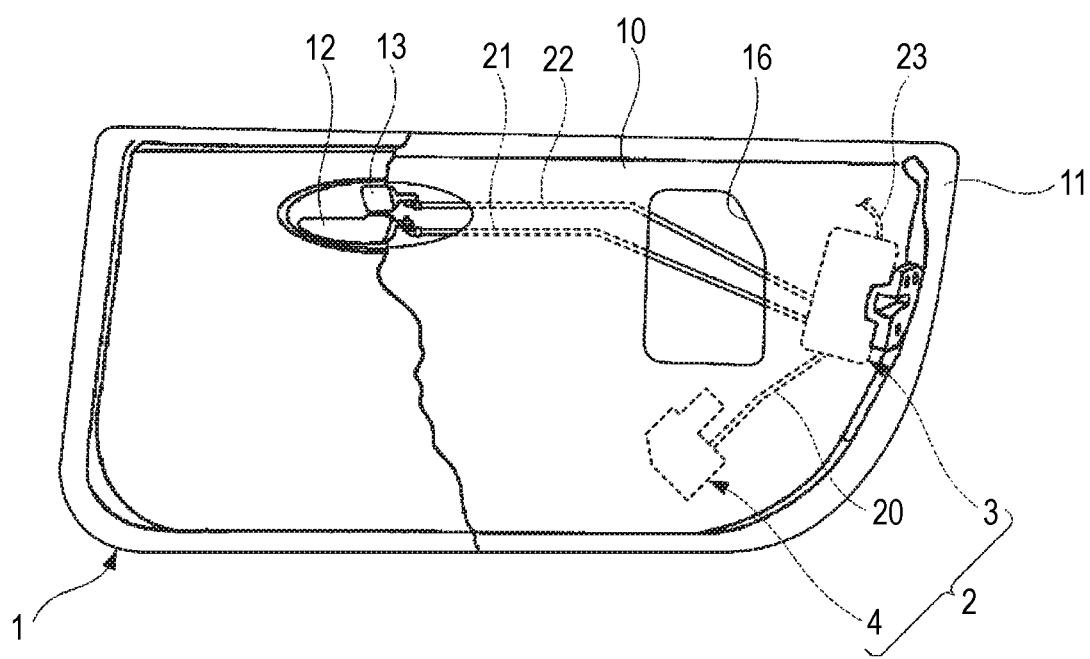

[FIG. 3]
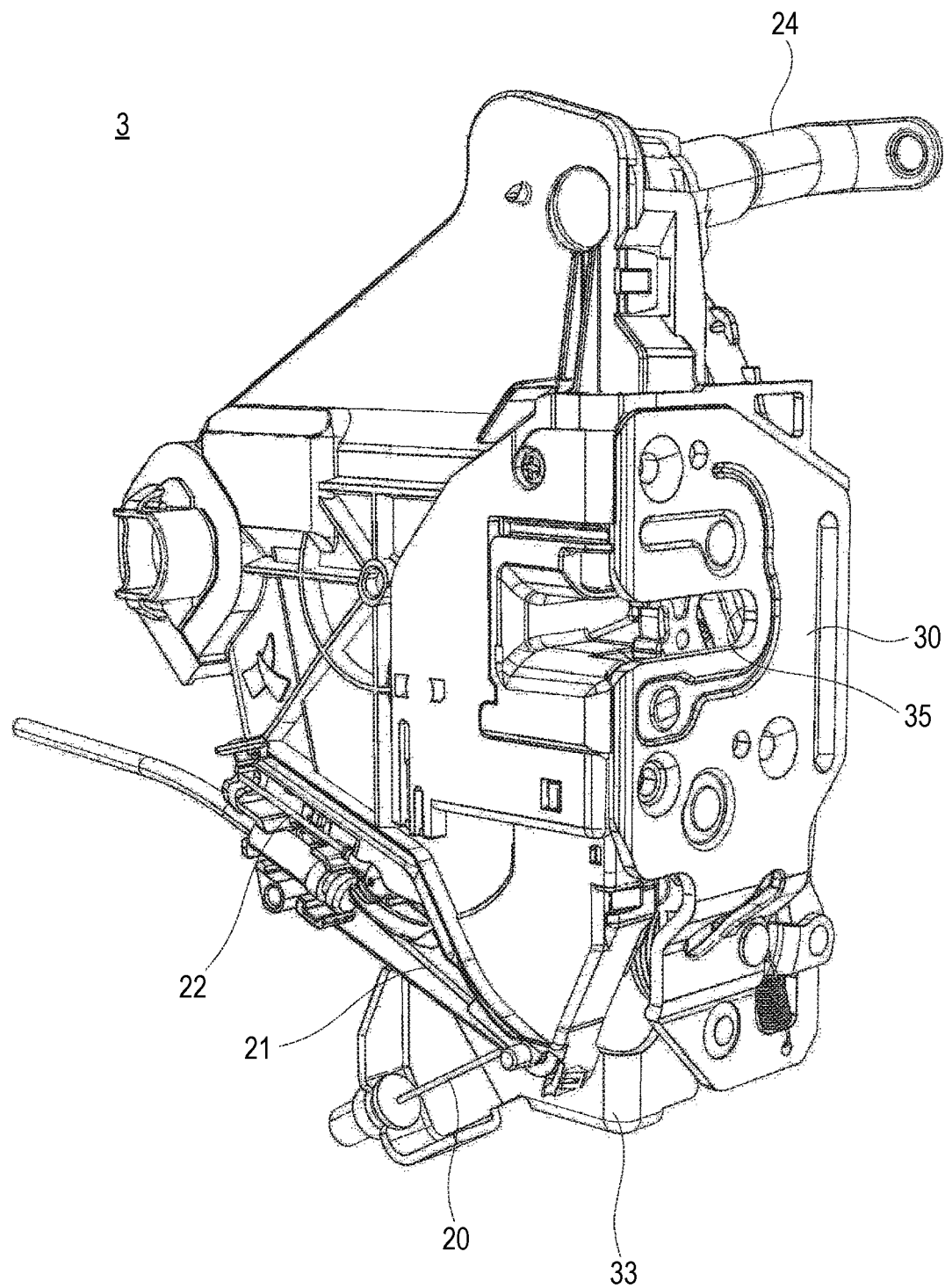

[FIG. 4]
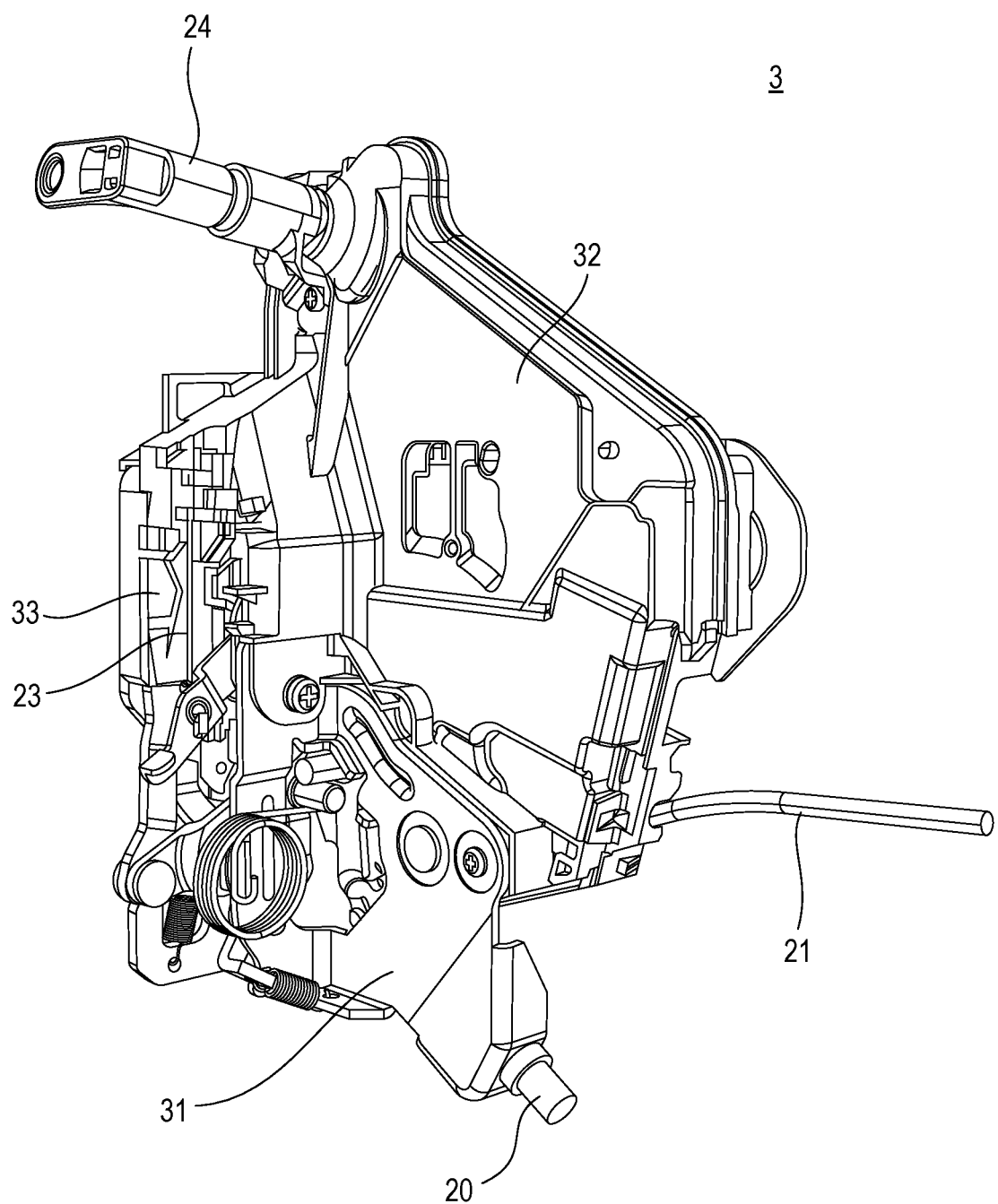

[FIG. 5]
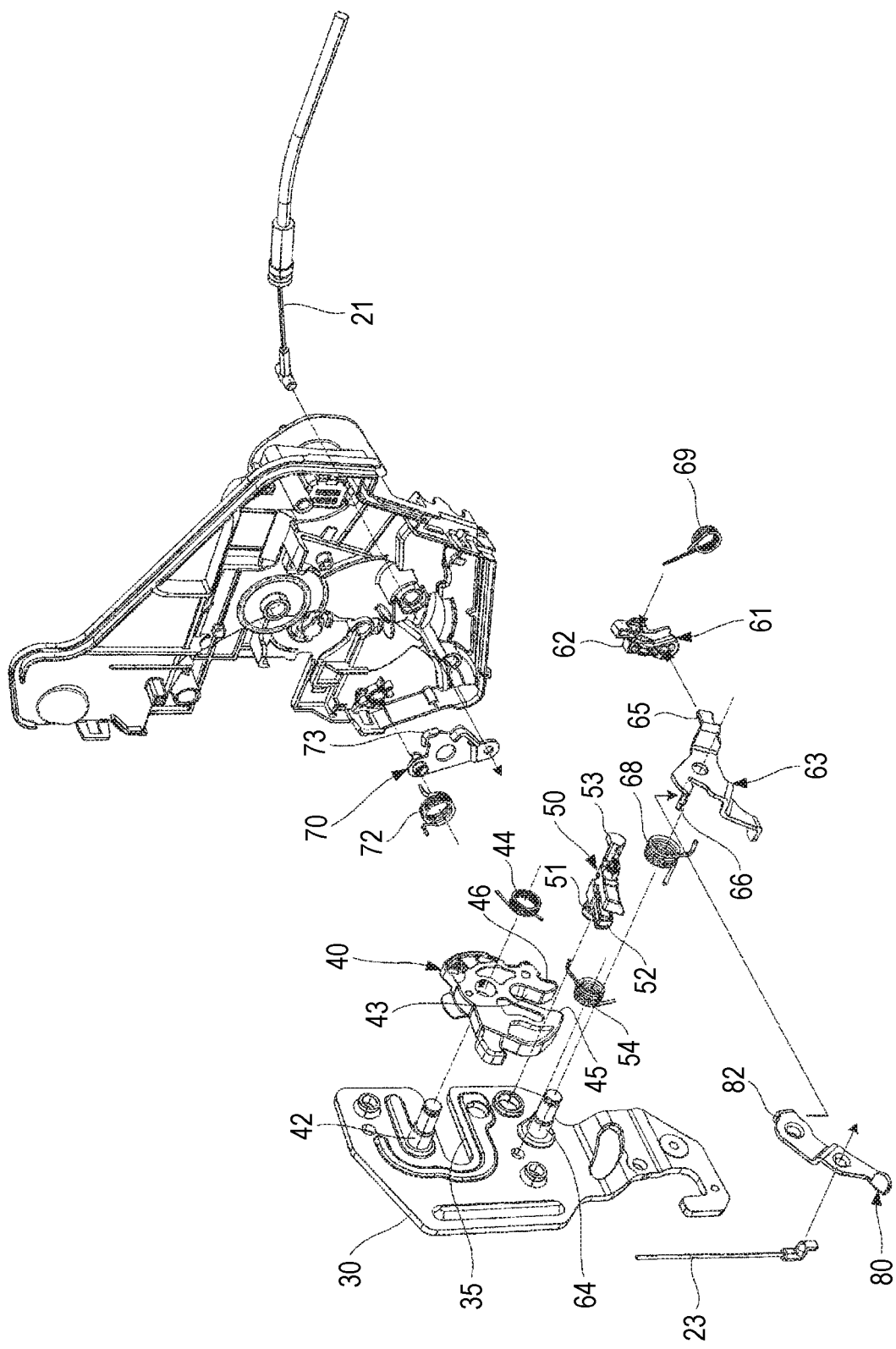

[FIG. 6]
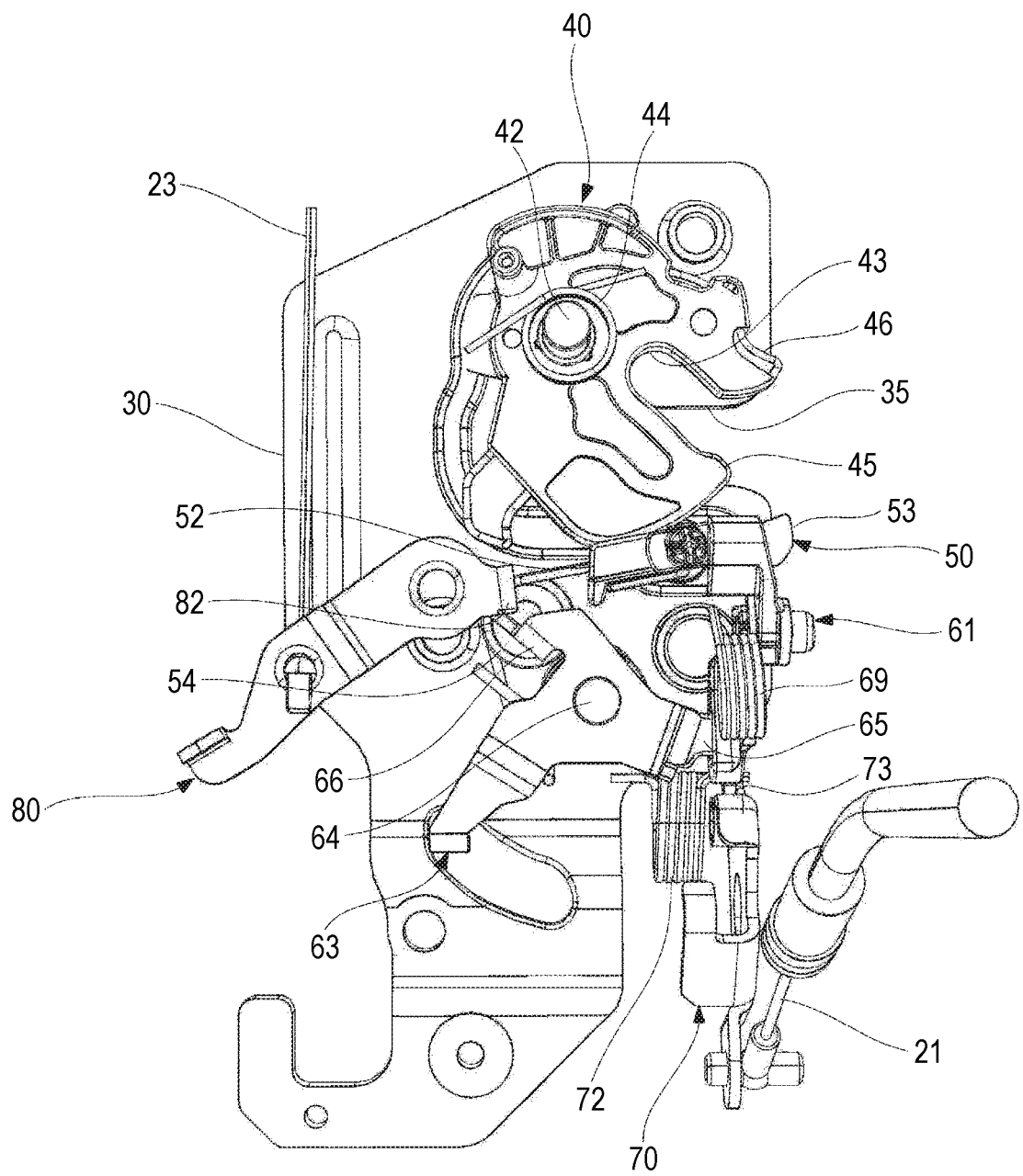

[FIG. 7]
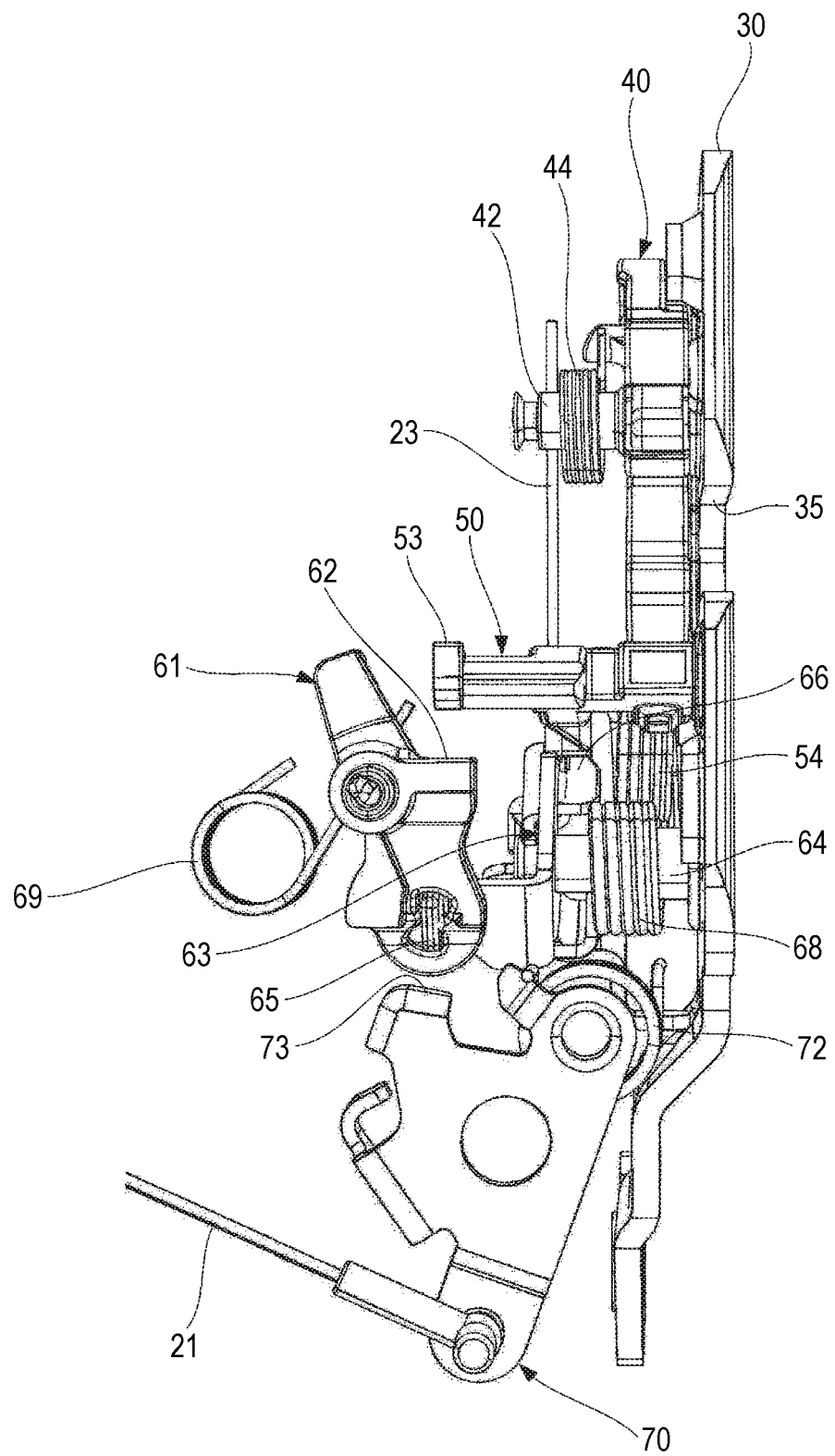

[FIG. 8]
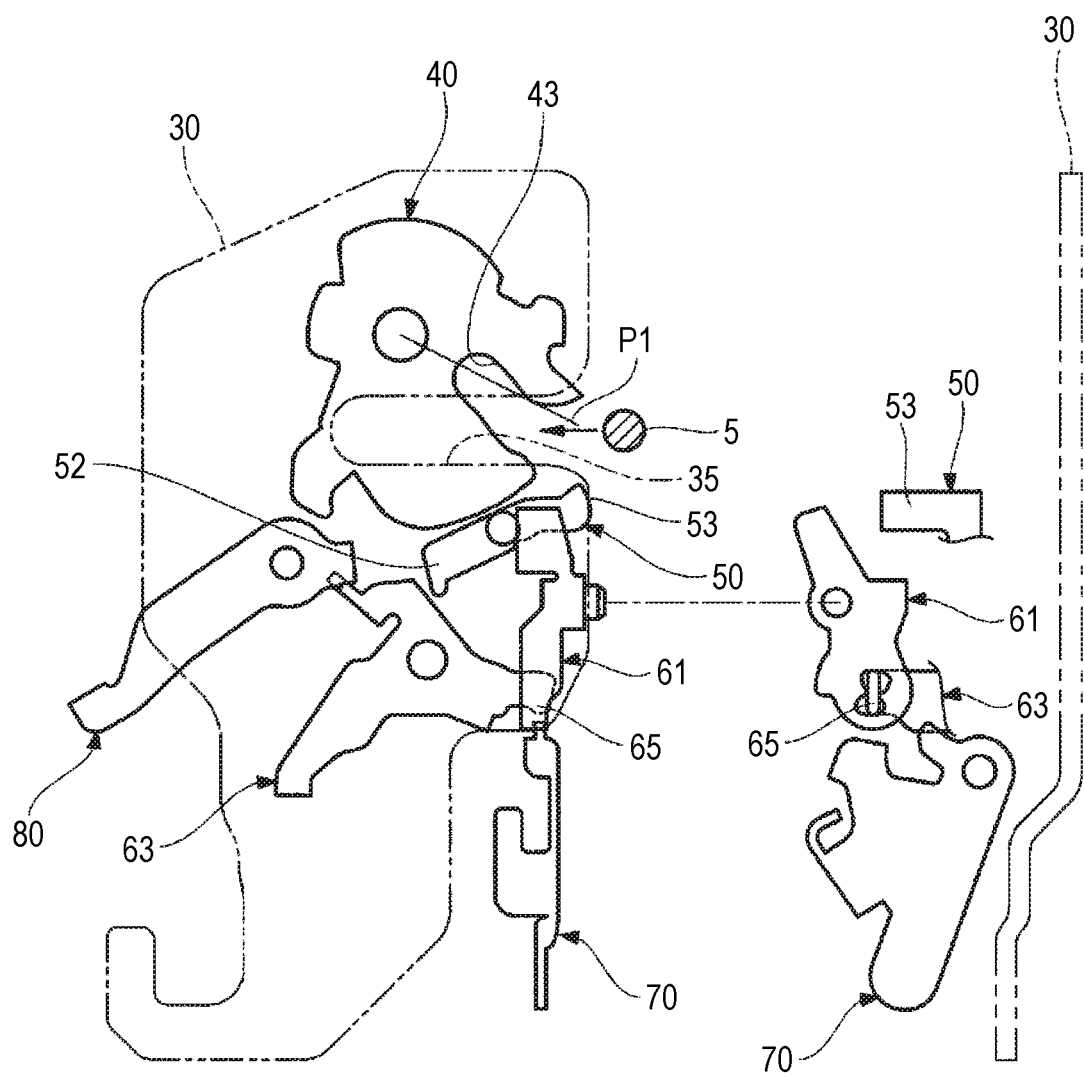

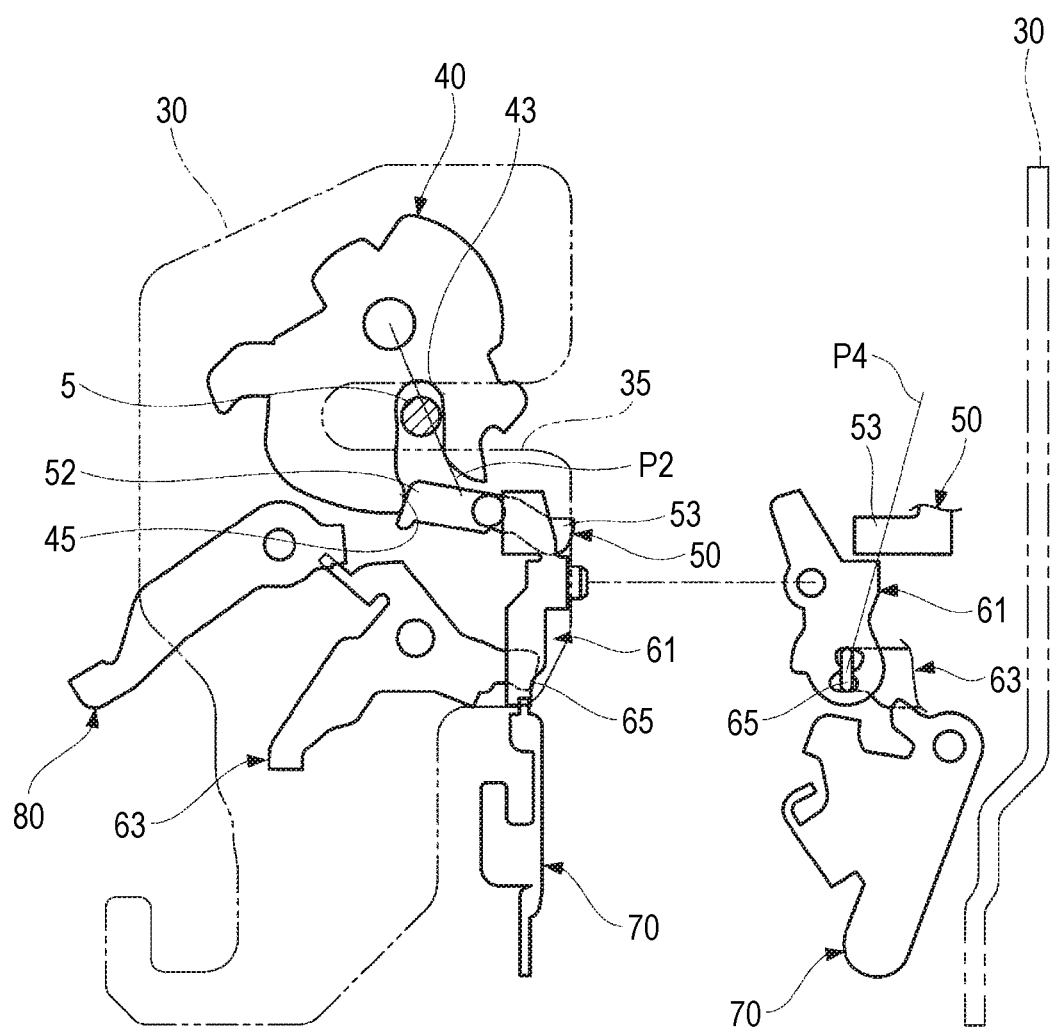
[FIG. 9]

[FIG. 10]
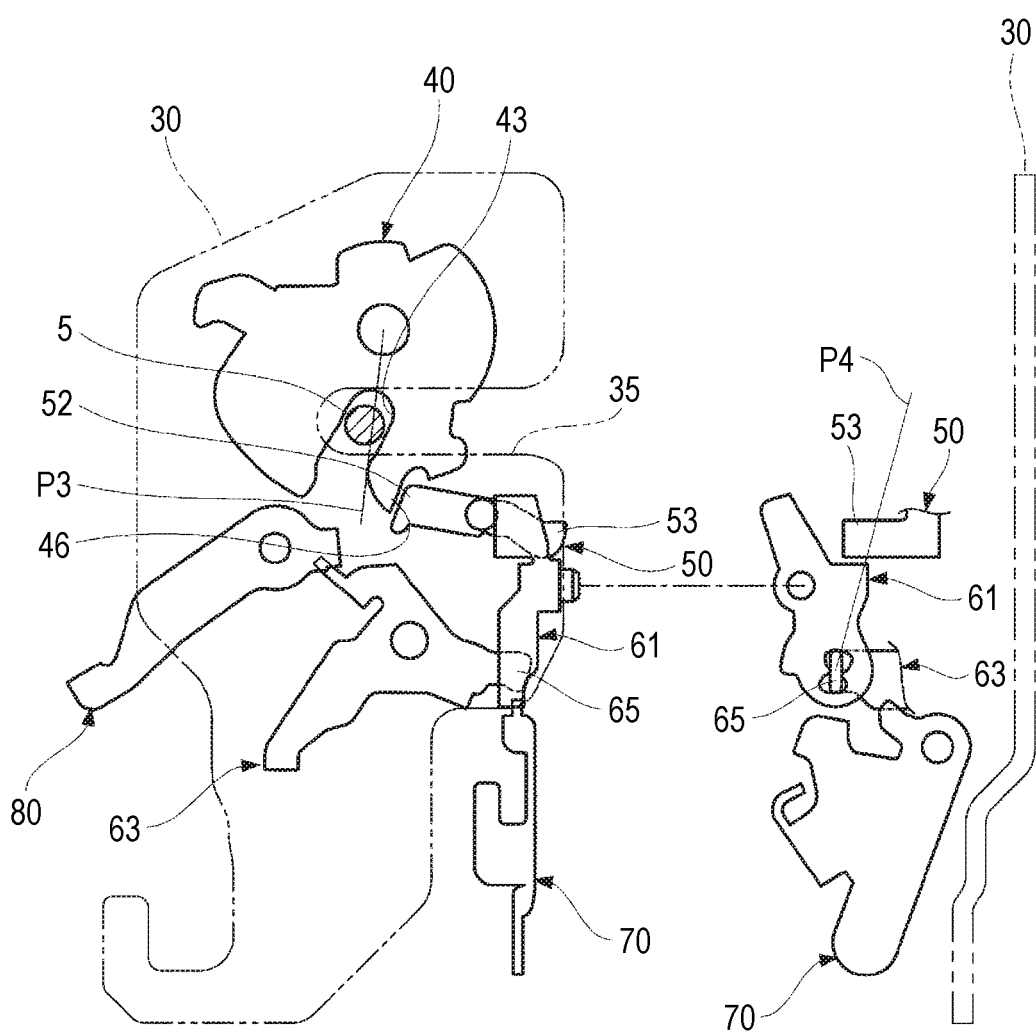

[FIG. 11]
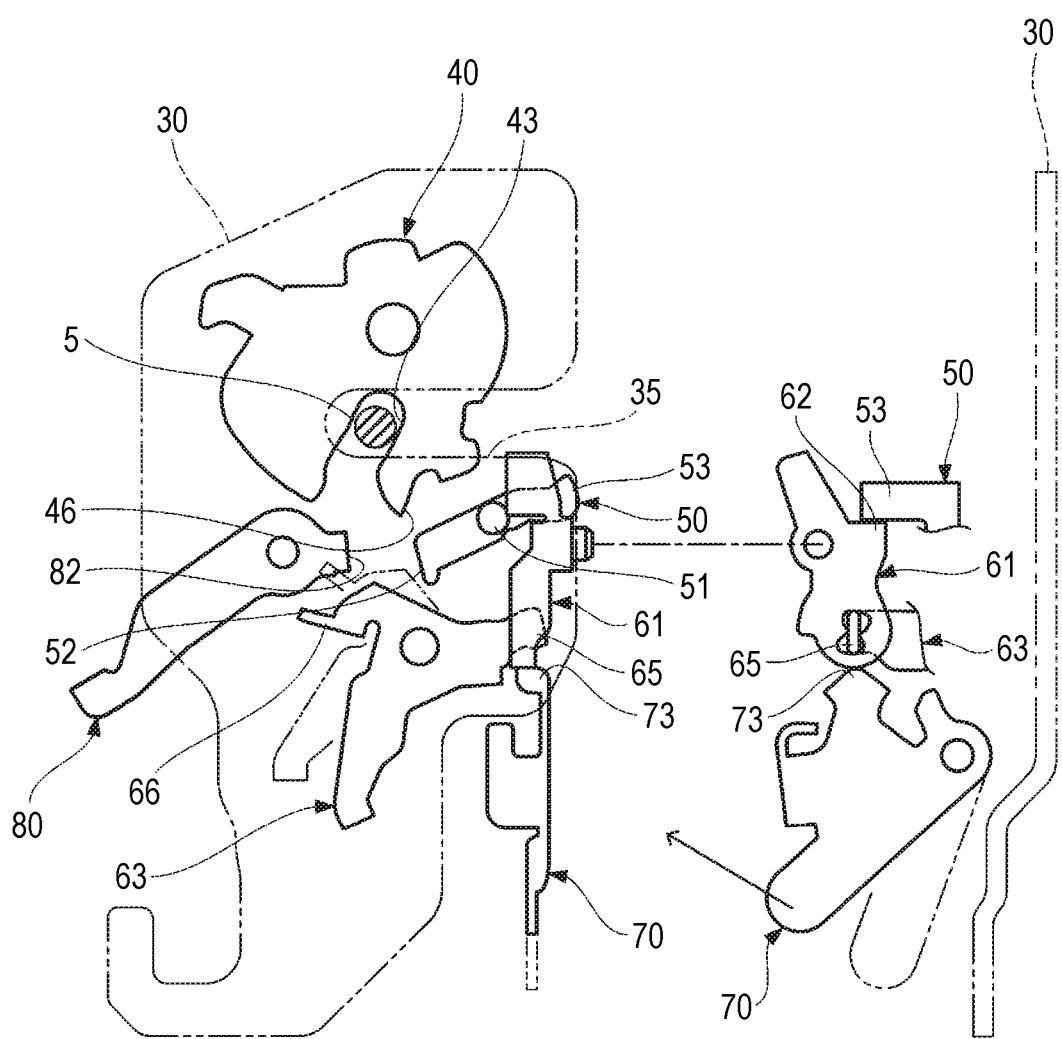

[FIG. 12]
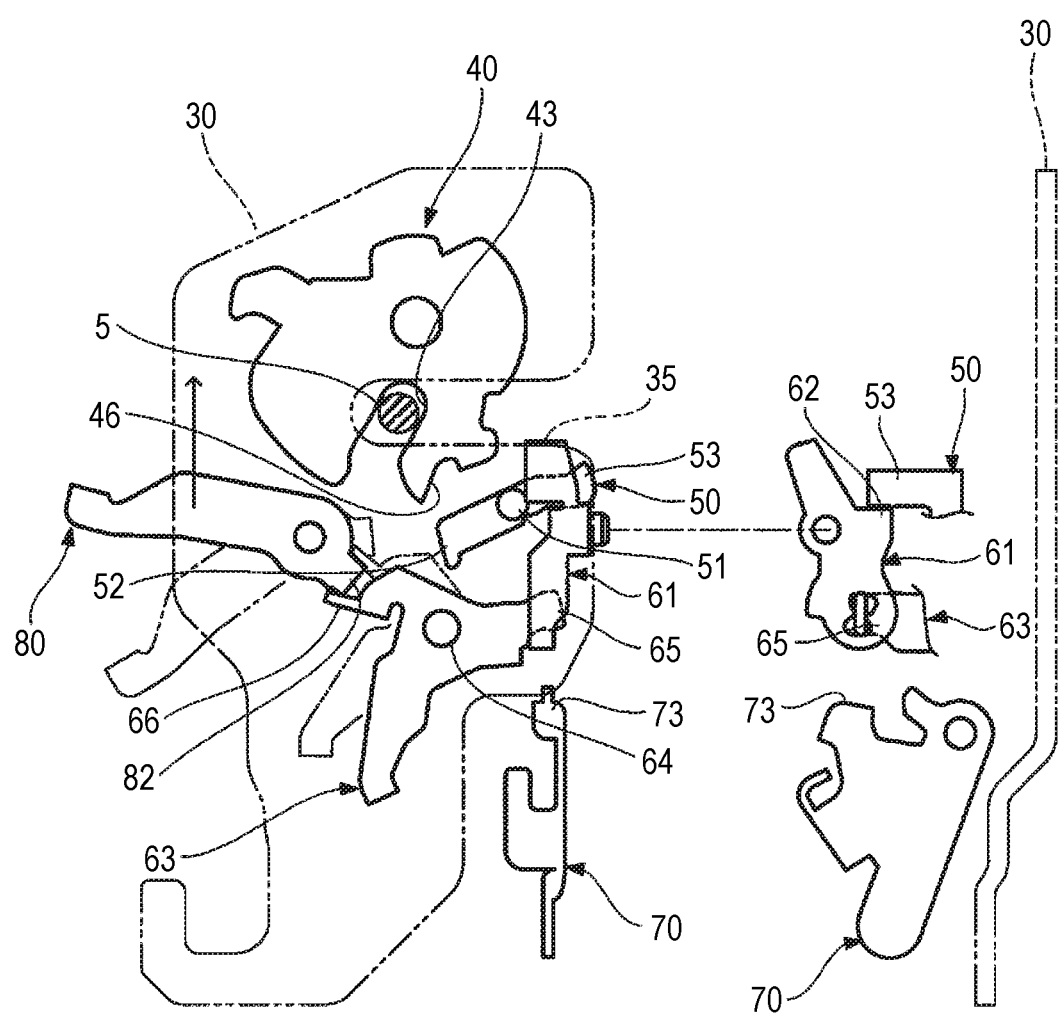

[FIG. 13]
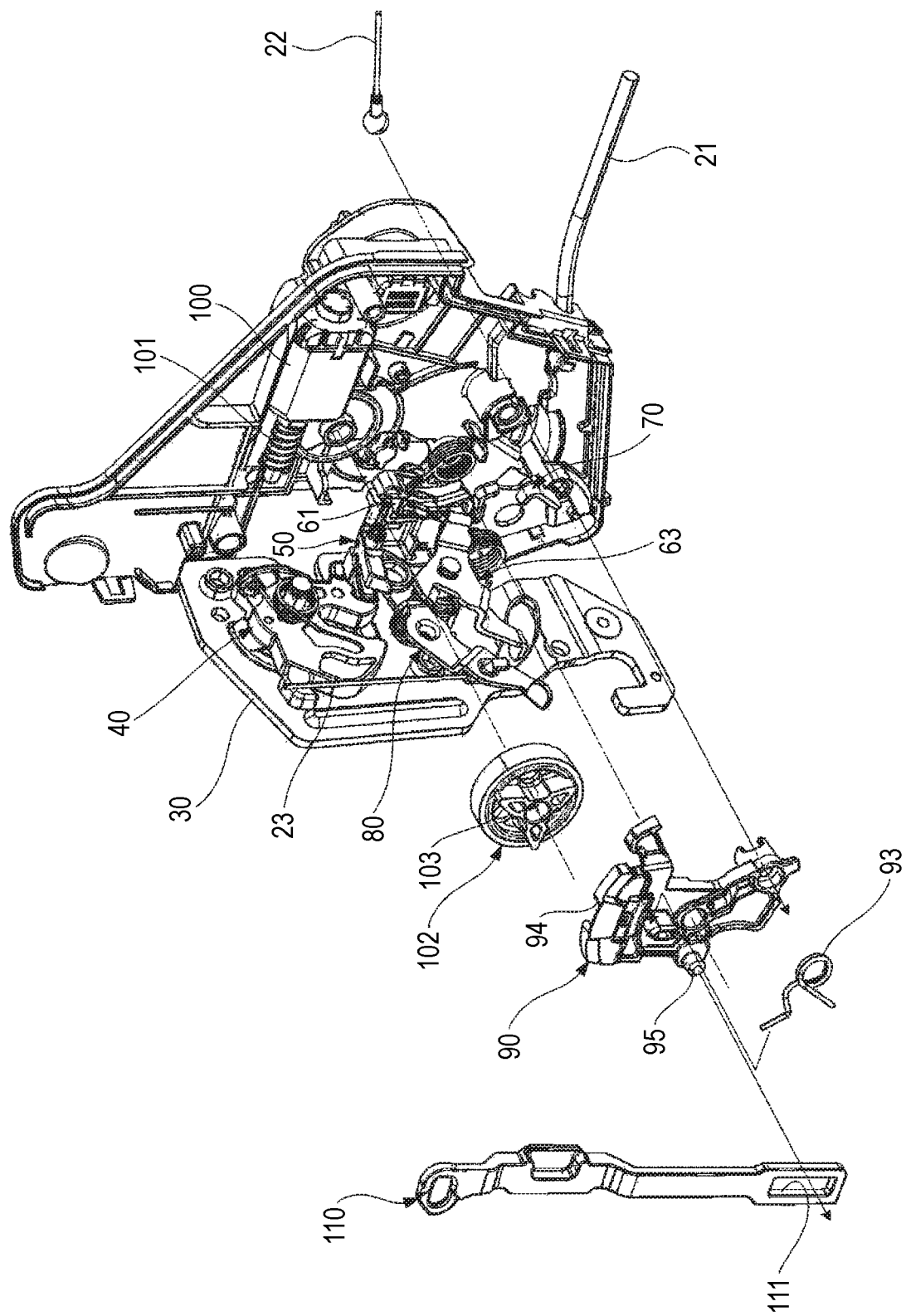

[FIG. 14]
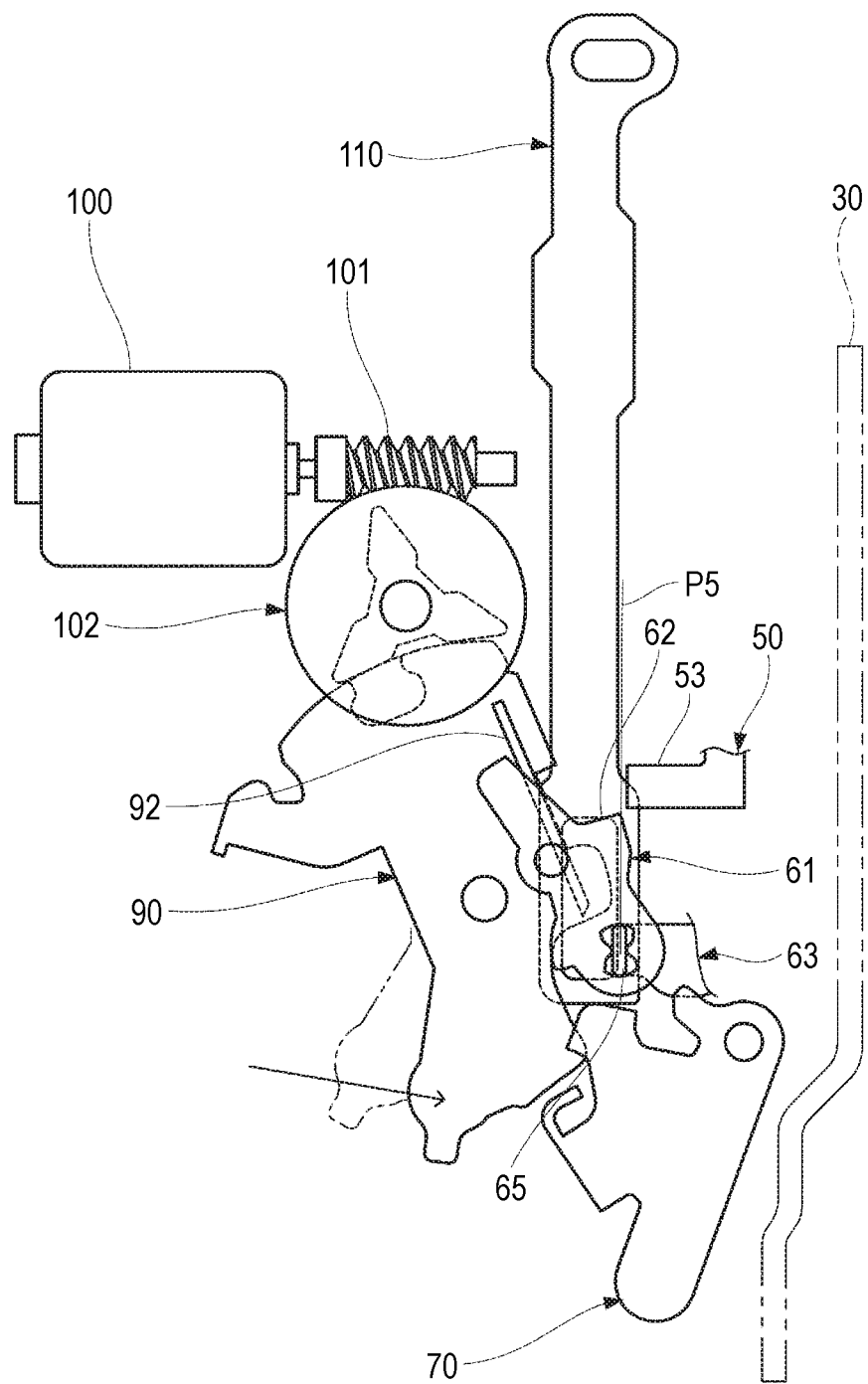

[FIG. 15]
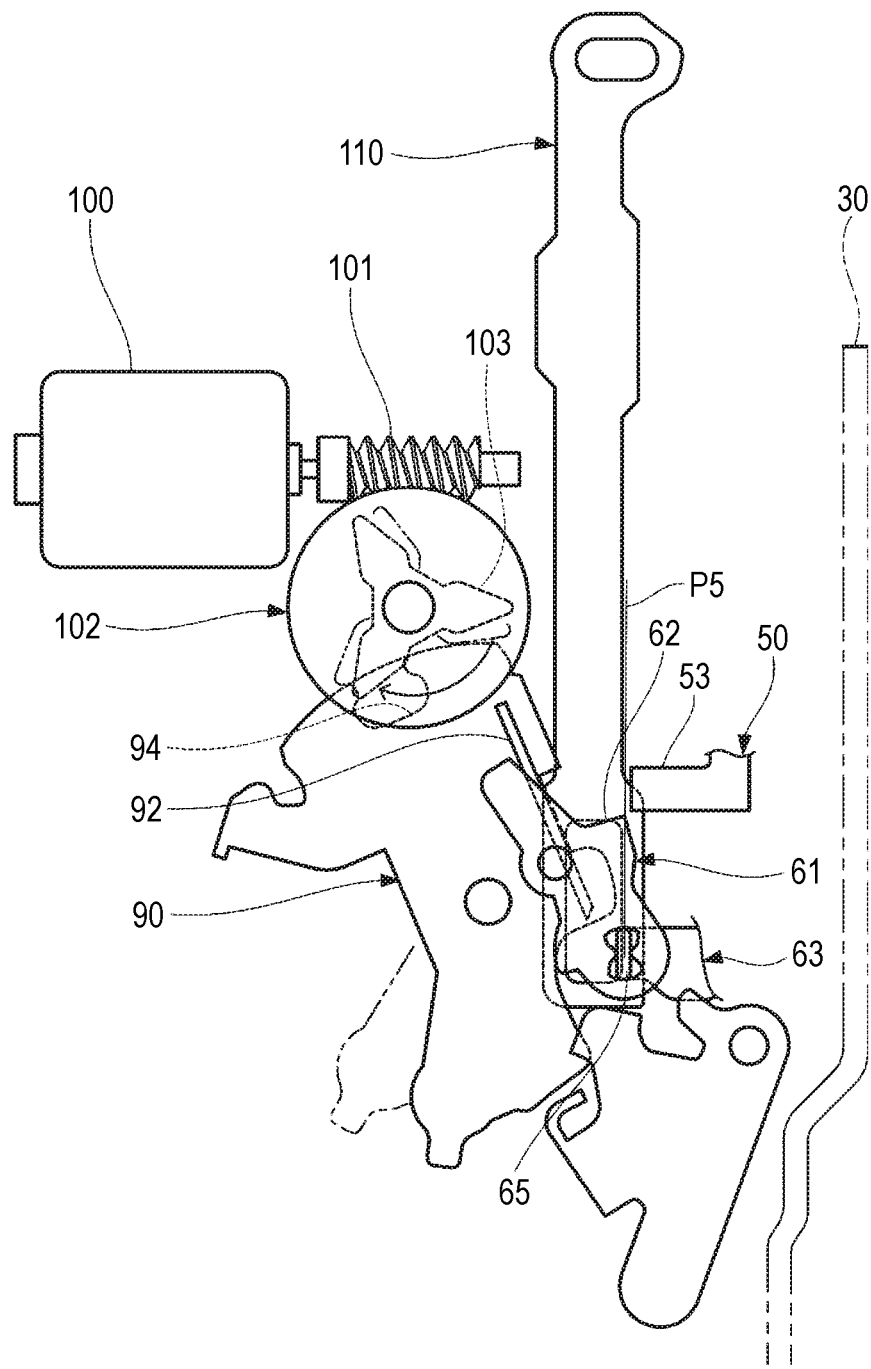

[FIG. 16]
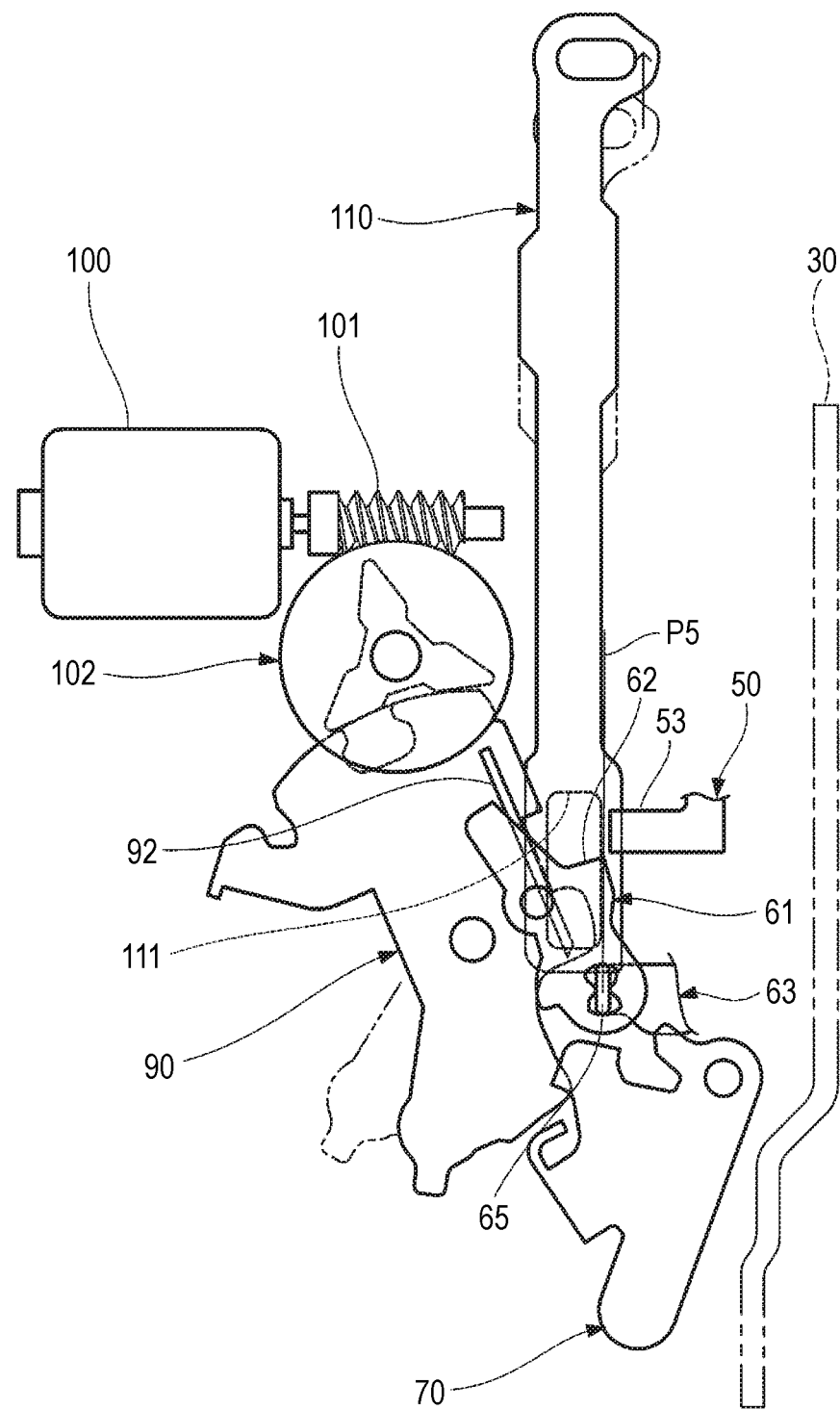

[FIG. 17]
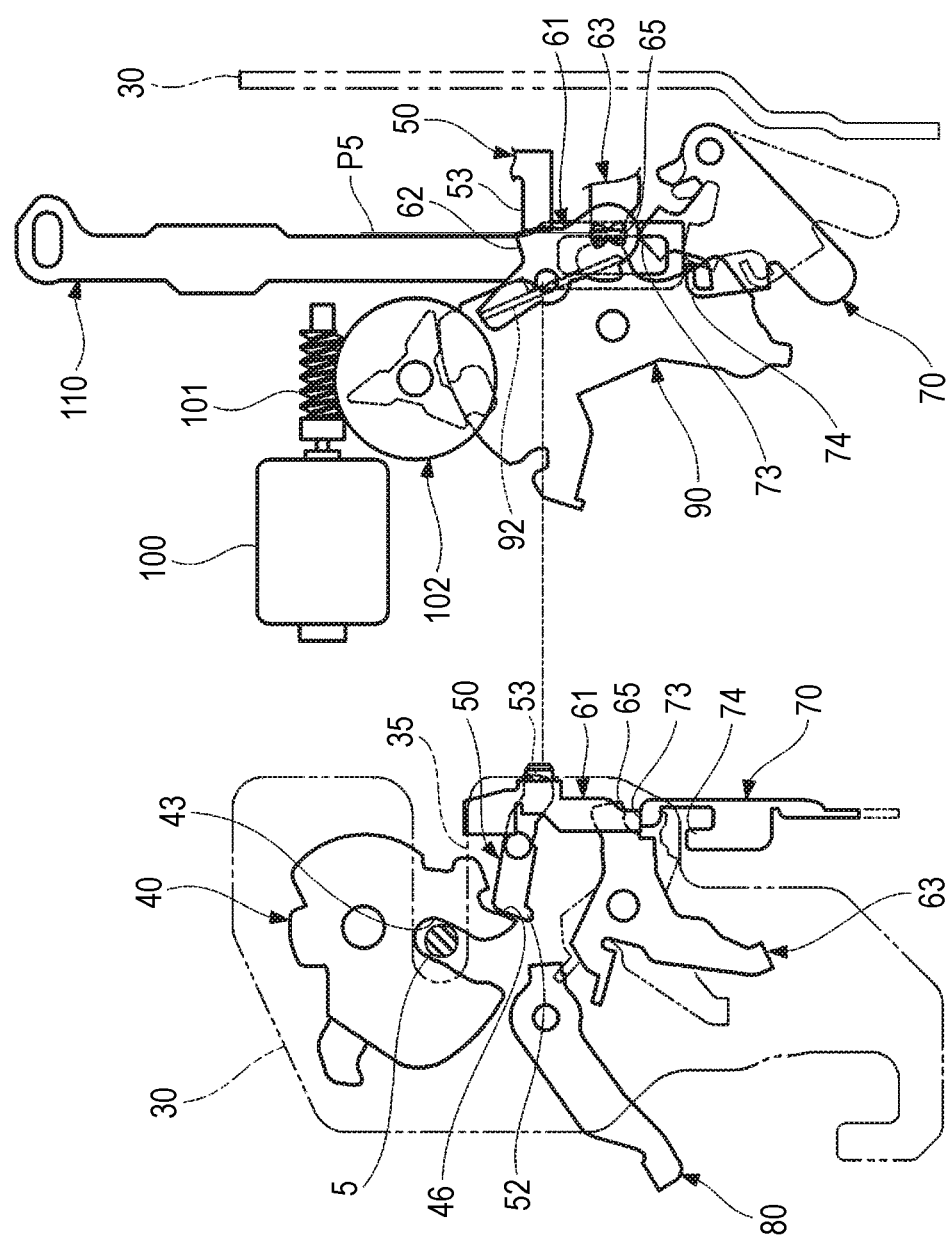

[FIG. 18]
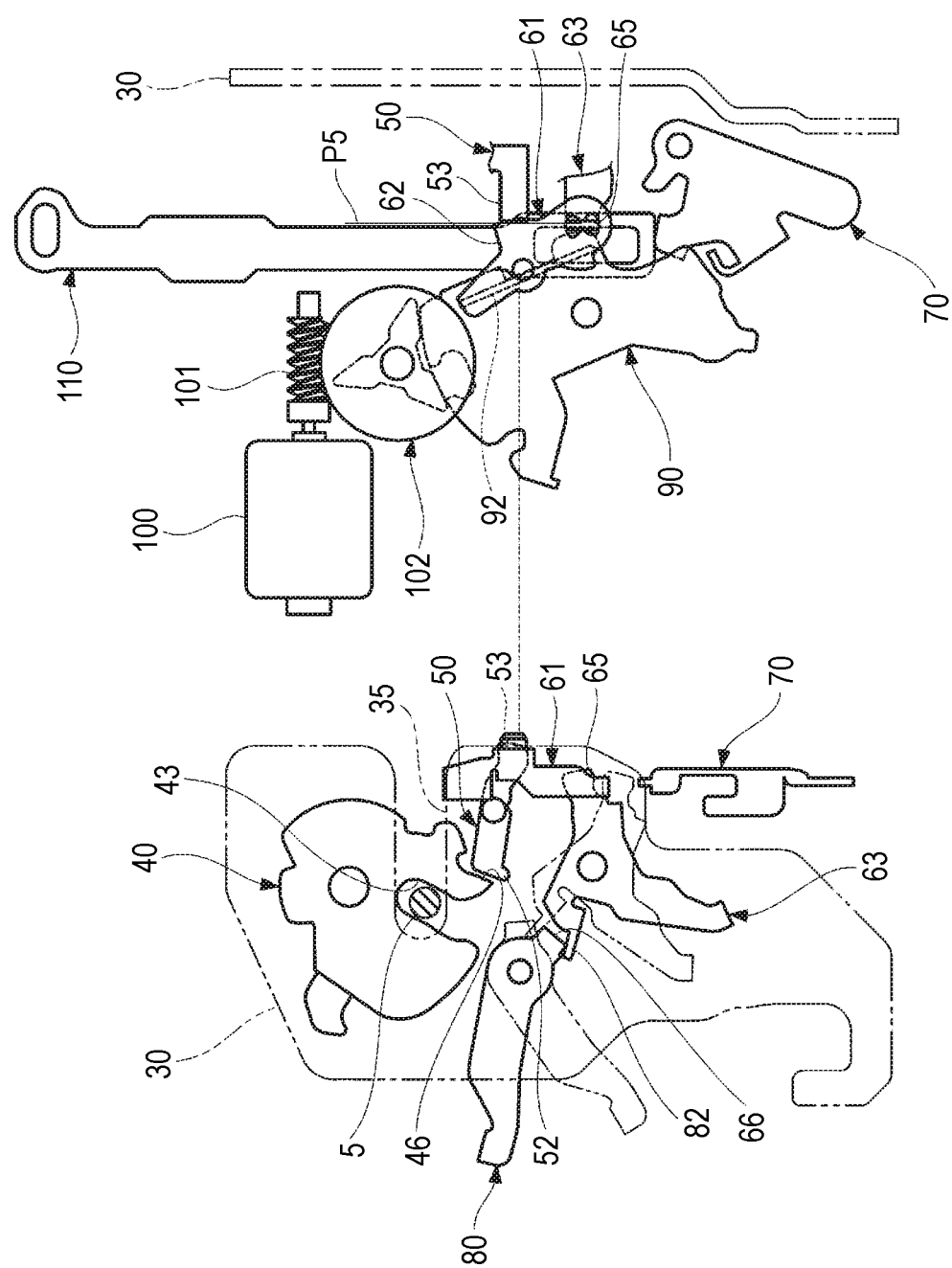

[FIG. 19]
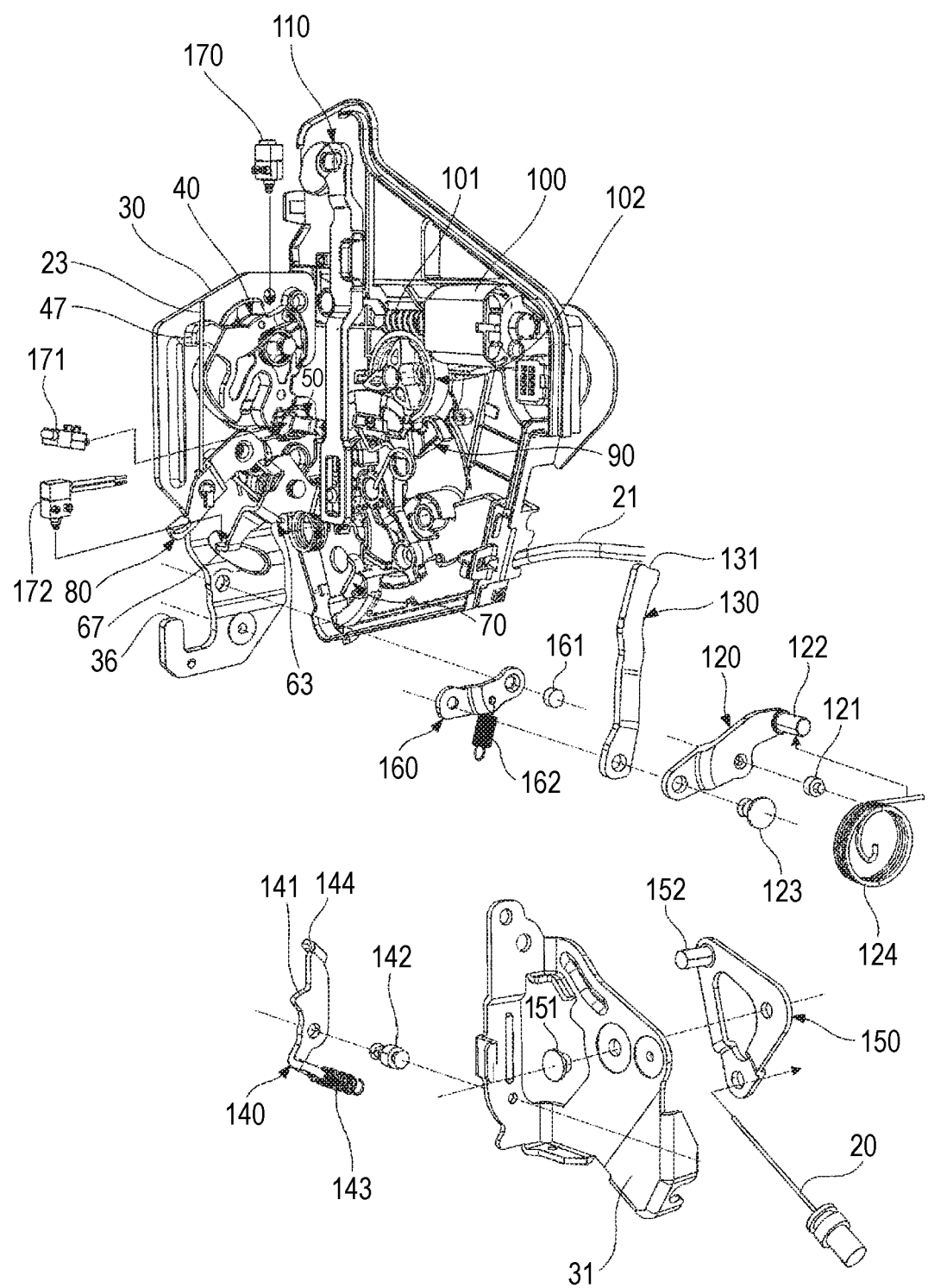

[FIG. 20]
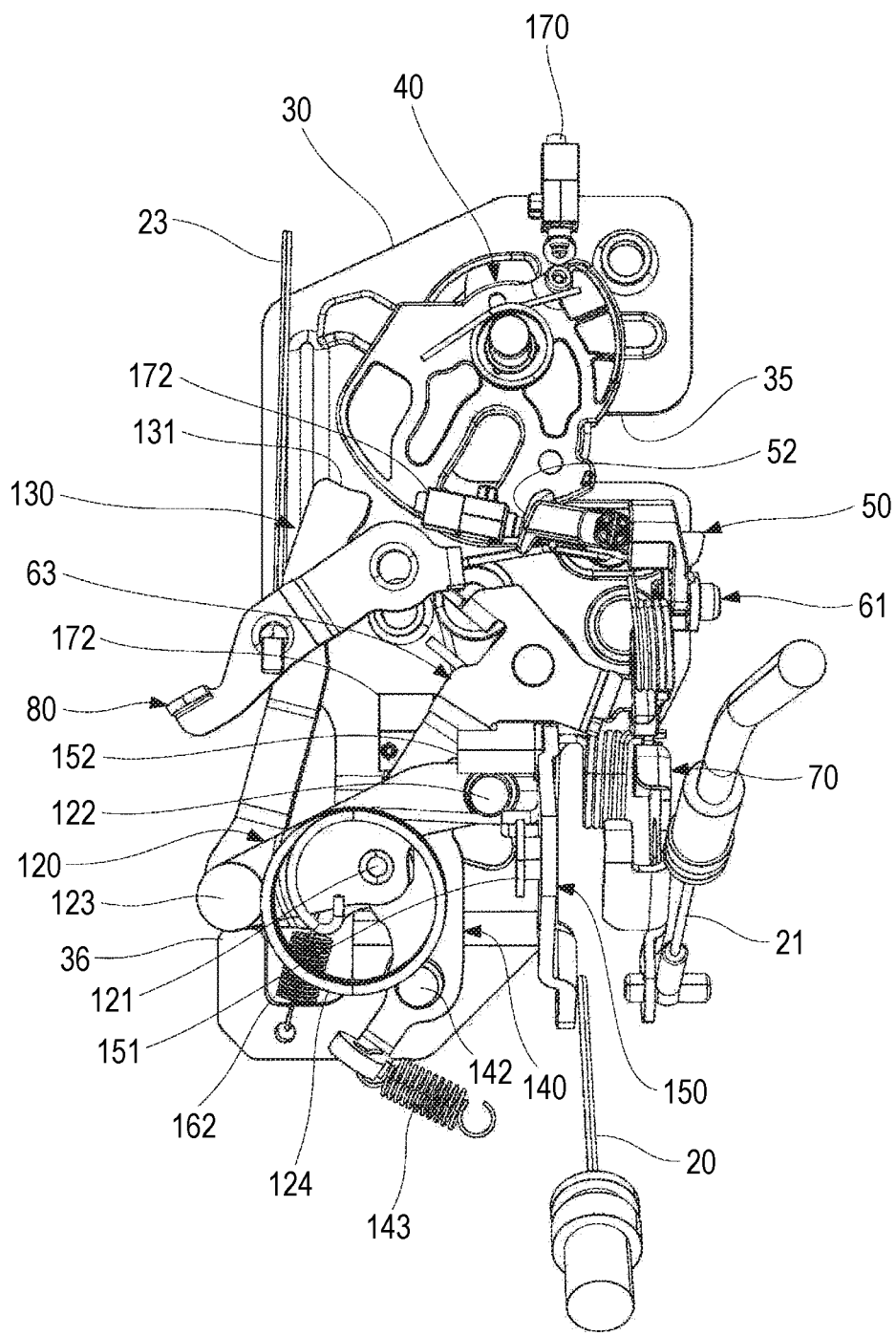

[FIG. 21]
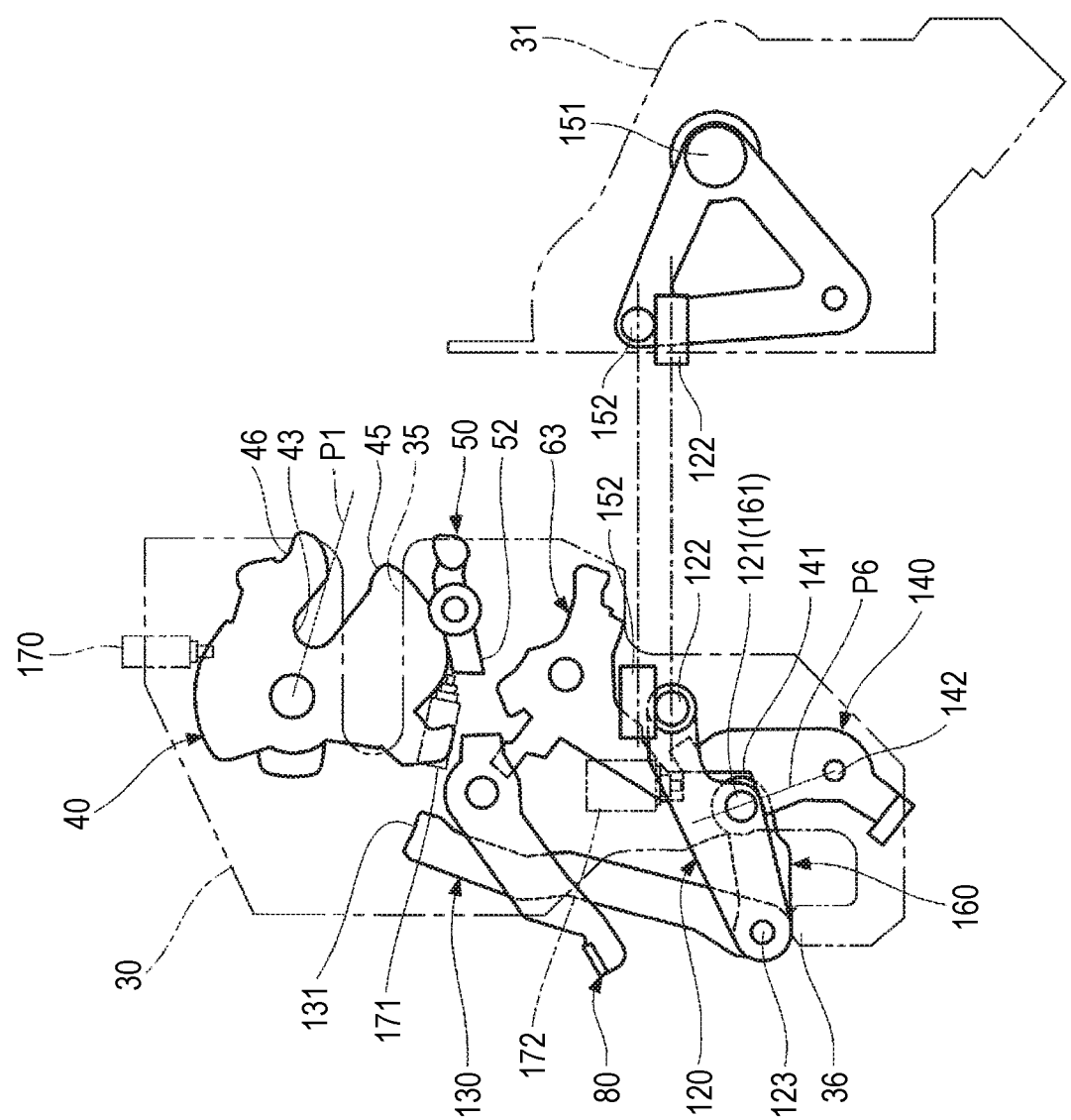

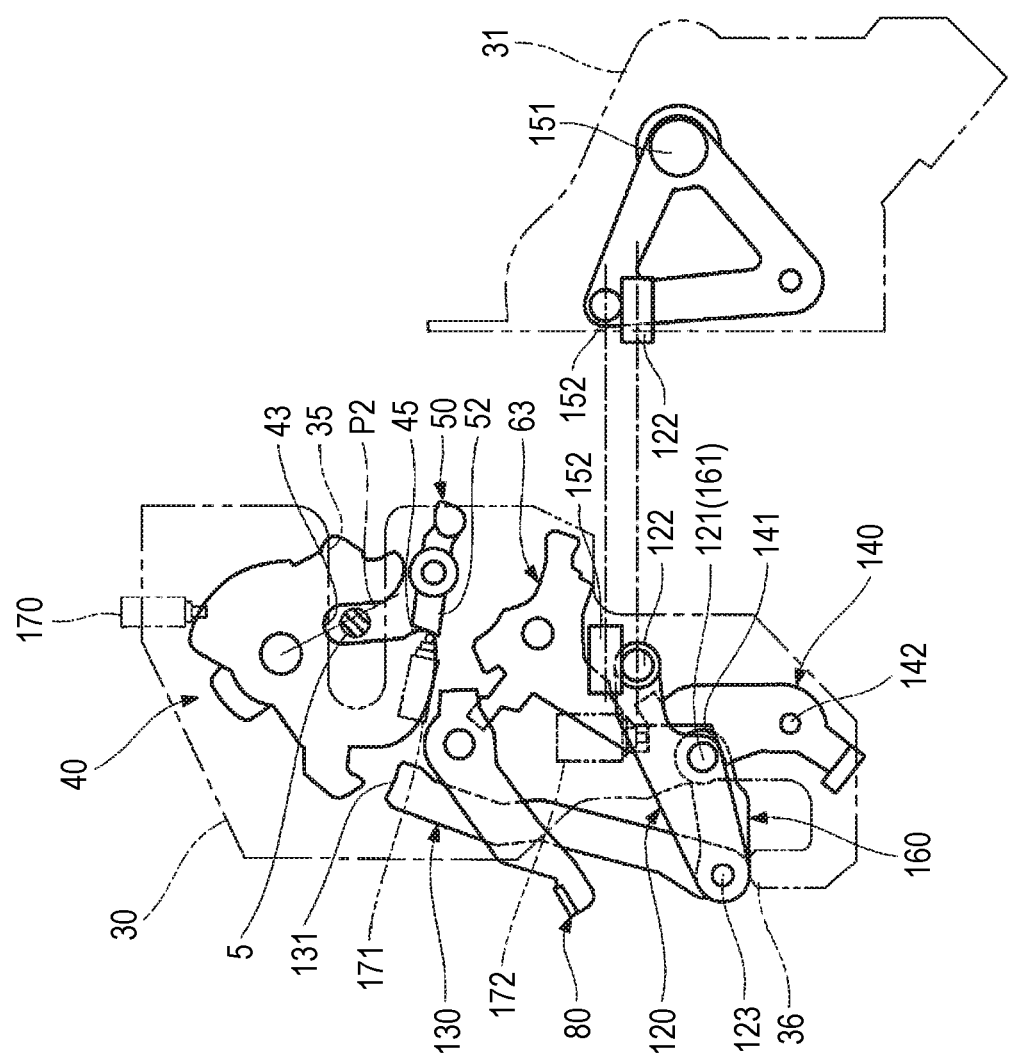
[FIG. 22]

[FIG. 23]
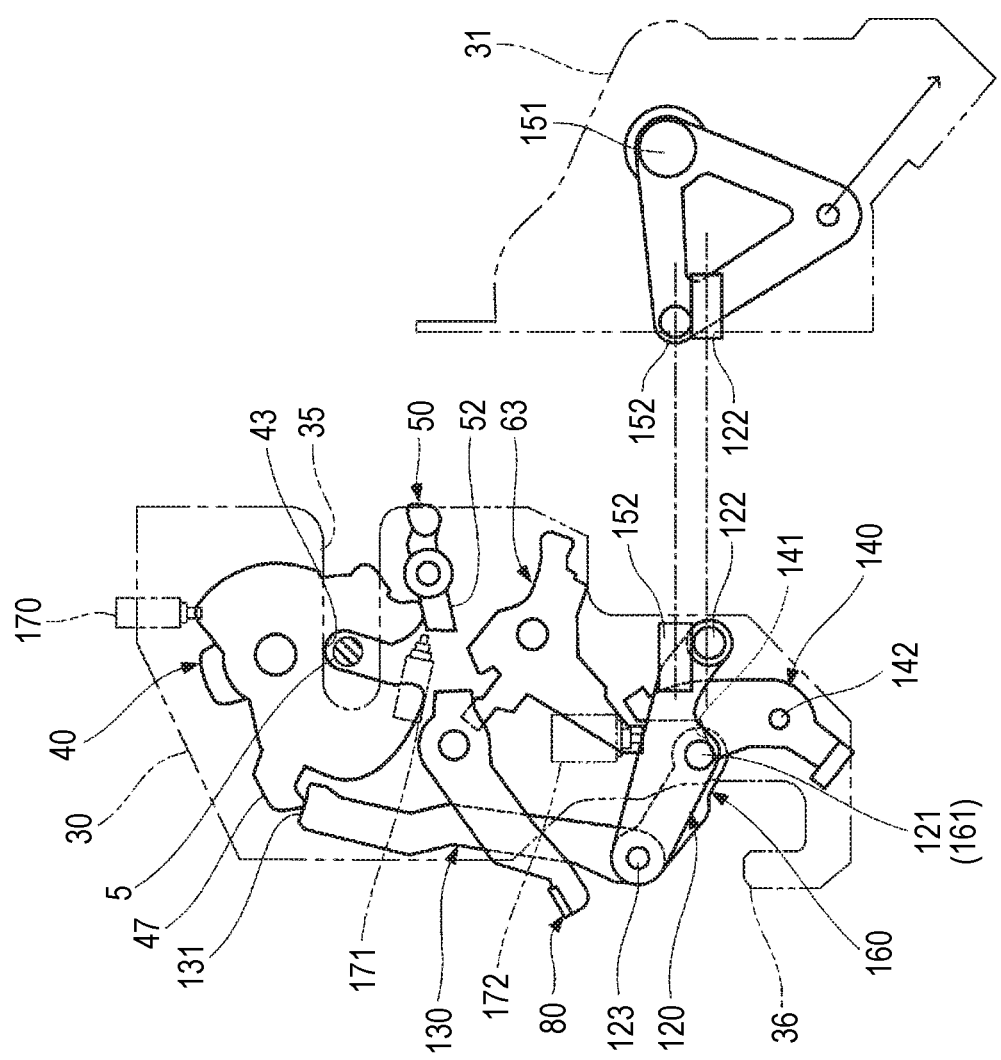

[FIG. 24]
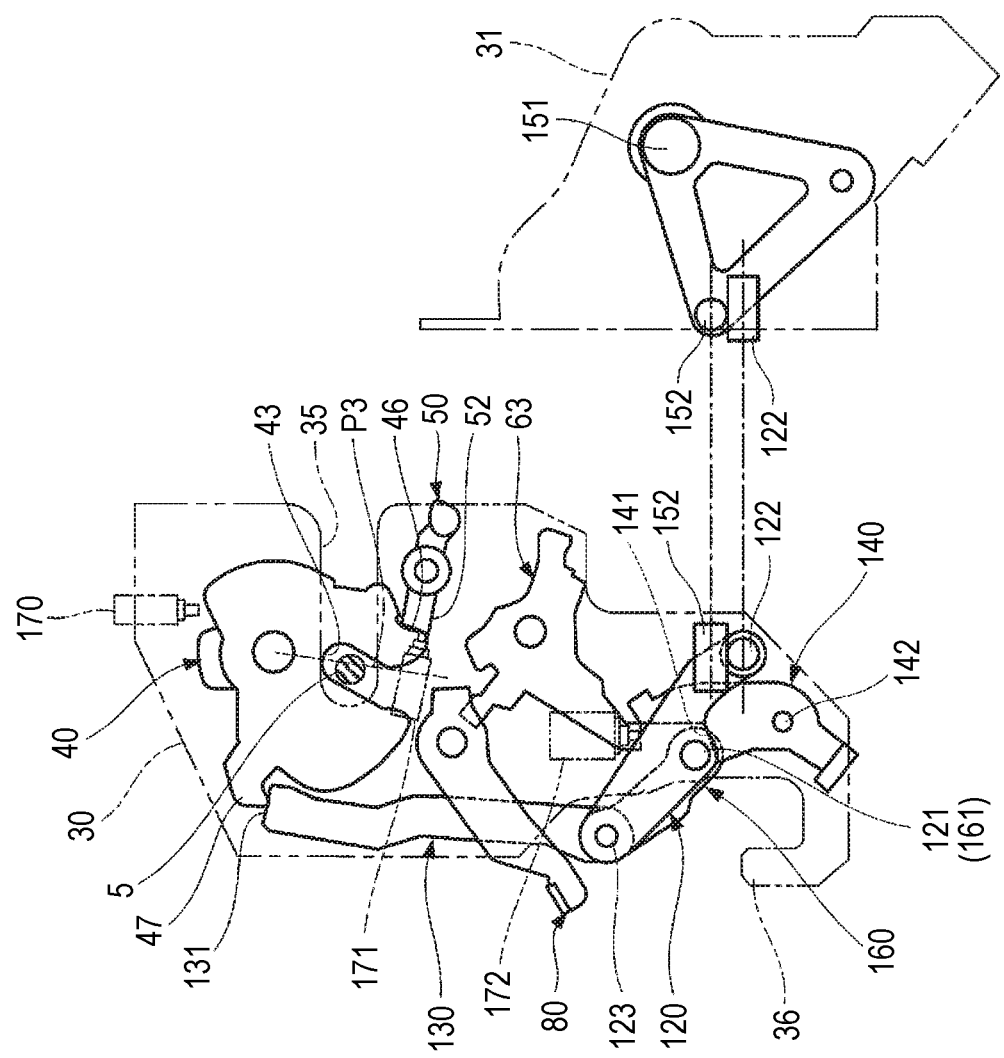

[FIG. 25]
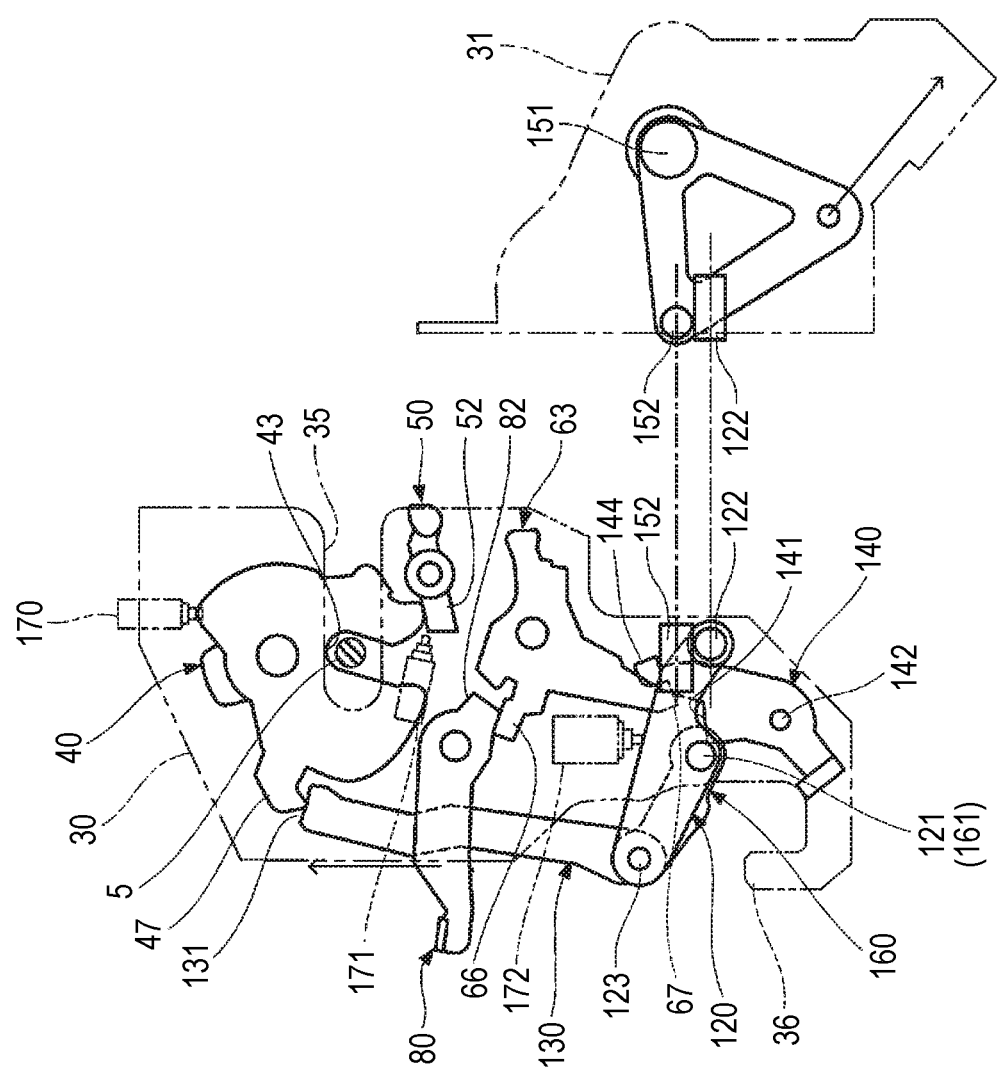

[FIG. 26]
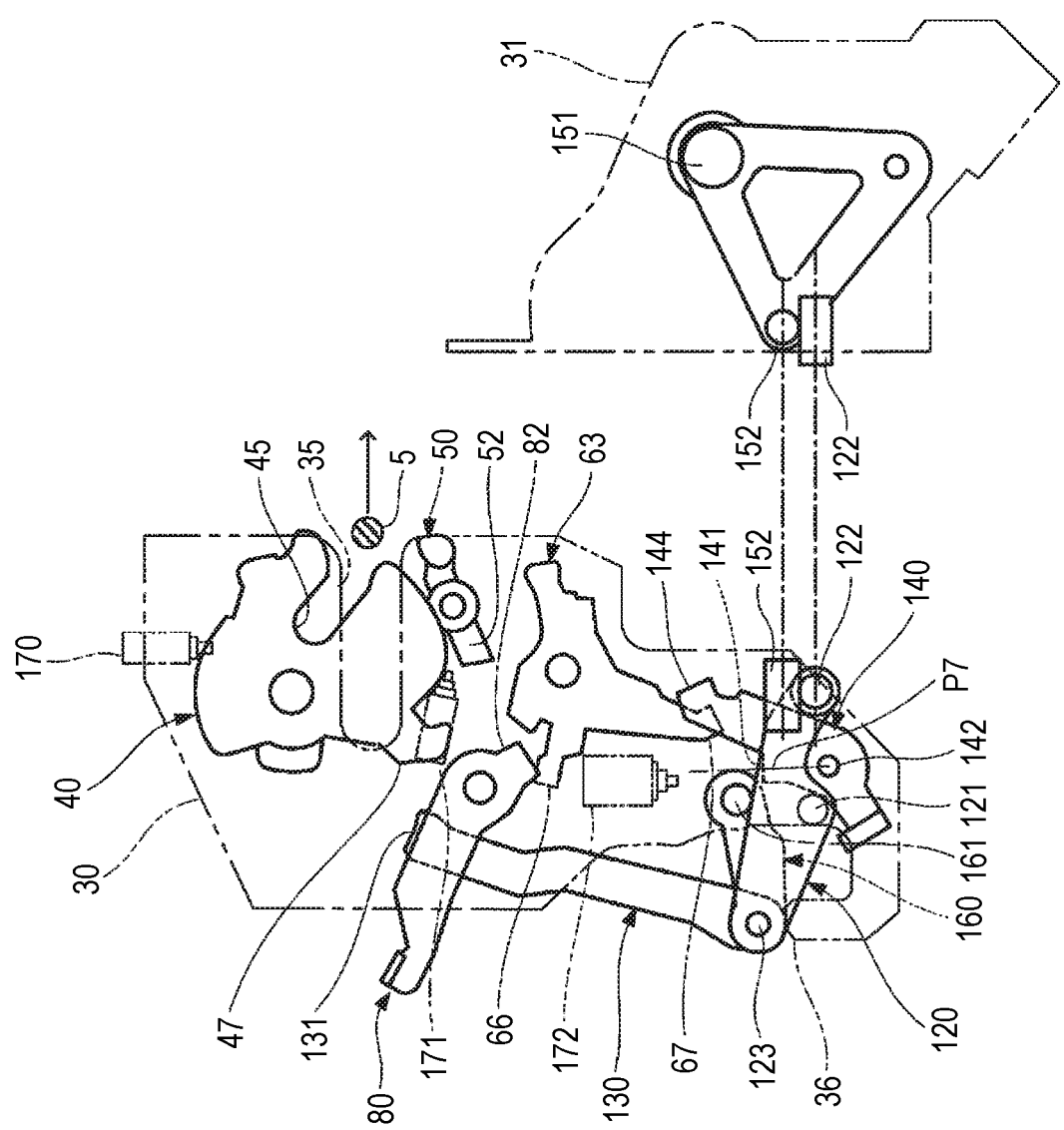

[FIG. 27]
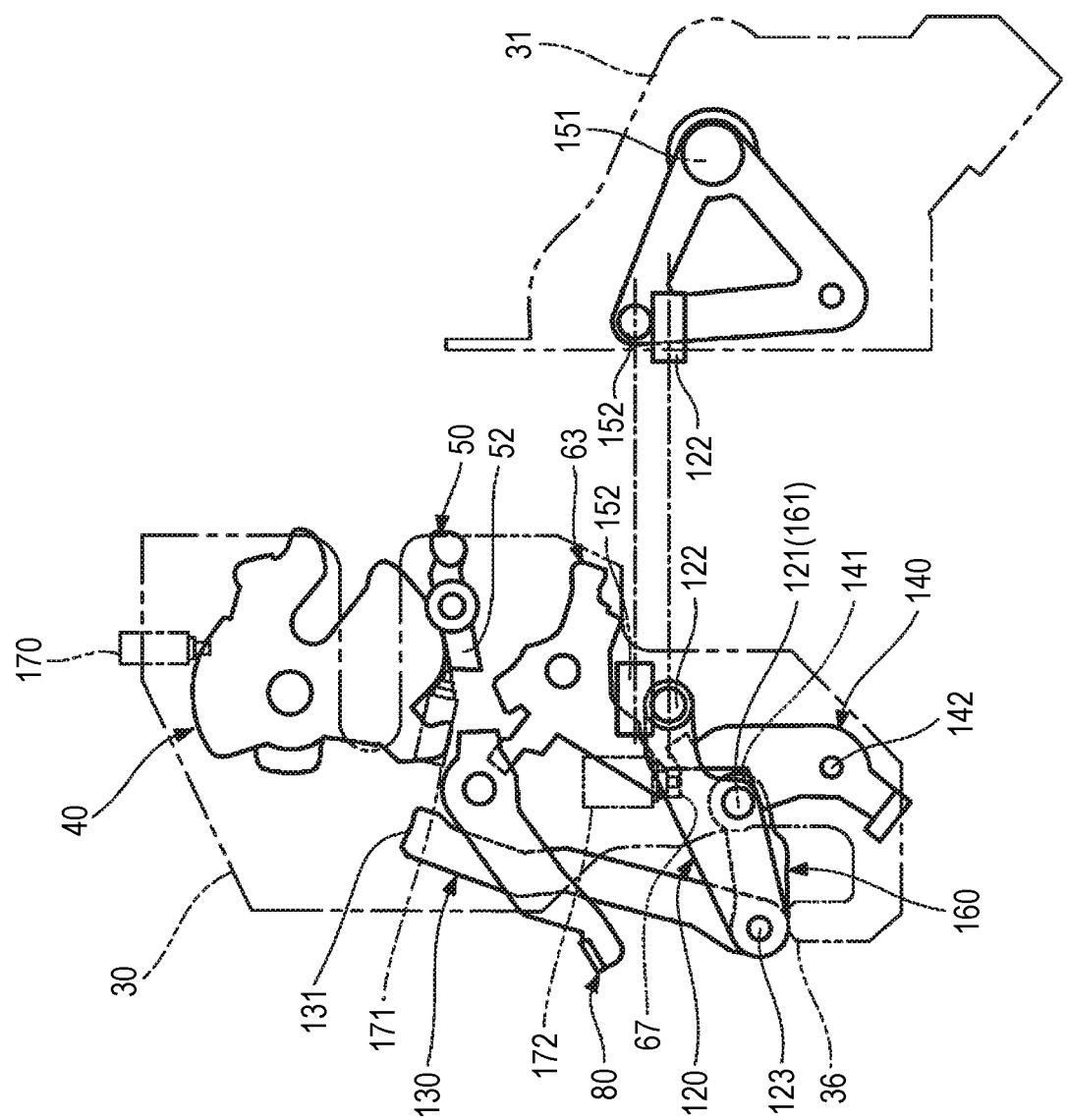

DOOR CLOSING DEVICE

CROSS-REFERENCE TO RELATED APPLICATIONS

This is a U.S. national stage application claiming the benefit of International Patent Application No. PCT/JP2016/062948 filed Apr. 25, 2016, the entire contents of which are incorporated herein by reference.

TECHNICAL FIELD

The present invention relates to a door closing apparatus provided on a door of a vehicle such as a motor vehicle.

BACKGROUND ART

A door closing apparatus includes a latching mechanism configured to be brought into engagement with a striker provided on a vehicle body to hold a vehicle door in a half closed state and a fully closed state and a closing mechanism that is linked with the latching mechanism to shift the latching mechanism from a half latching state where the latching mechanism holds the vehicle door in the half closed state to a fully latching state where the latching mechanism holds the vehicle door in the fully closed state.

A closing mechanism of a door closing apparatus described. PTL 1 includes a closing lever and a pull lever. The closing lever is pulled by a wire connected to a motor for activating the closing mechanism to operate and then presses a latch plate staying in a half latching position so as to rotate towards a fully latching position. The pull lever is linked with a pressing portion of the closing lever and is rotated in response to a door opening operation of an outside handle to rotate the closing lever in a direction in which the pressing portion of the closing lever is disengaged from the latch plate.

In the case where the pull lever is rotated while the closing lever is pulled by the wire to press the latch plate, the closing lever is rotated, whereby the pressing portion of the closing lever is disengaged from the latch plate. This makes it impossible for the closing lever to press the latch plate, whereby the closing operation of the door closing apparatus is cancelled.

A closing mechanism of a door closing apparatus described PTL 2 includes an active lever, a passive lever and a canceling lever. The active lever is rotated by a motor for activating the closing mechanism to operate. The passive lever is coupled to the active lever so as to rotate relative thereto in a position that differs from a rotational center of the active lever. Then, the passive lever has an engaging pin that is disposed to be superposed on the rotational center of the active lever and is supported by the canceling lever. The passive lever rotates together with the active lever with the engaging pin supported by the canceling lever to press a latch plate staying in a half latching position so that the latch plate rotates towards a fully latching position. When the cancelling lever rotates in response to a door opening operation of an outside handle, the supporting of the engaging pin by the cancelling lever is cancelled.

In the case where the cancelling lever is rotated while the passive lever is rotated by the active lever to keep pressing the latch, the supporting of the engaging pin by the cancelling lever is cancelled, the passive lever can rotate relative to the active lever. This makes it impossible for the passive lever to press the latch, whereby the closing operation of the door closing apparatus is cancelled.

CITATION LIST

Patent Literature

PTL 1: Japanese Patent No. 3574335
PTL 2: Japanese Patent No. 4092770

SUMMARY OF INVENTION

Technical Problem

In the door closing apparatus described in PTL 1, the closing lever that presses the latch plate is rotated, and the pressing portion of the closing lever is disengaged from the latch plate, whereby the closing operation of the door closing apparatus is cancelled. Although the closing lever is rotated by the pull lever that is linked with the pressing portion, a relatively great load is exerted on the pressing portion of the closing lever, and relatively great rotational torque is required on the closing lever to displace the pressing portion from the latch plate to be disengaged therefrom. Due to this, a door opening operation of the outside handle that rotates the pull lever becomes heavy or needs much effort.

In the door closing apparatus described in PTL 2, the cancelling lever that supports the engaging pin configuring the rotational center of the passive lever that presses the latch is rotated, and the supporting of the engaging pin by the cancelling lever is cancelled, whereby the closing operation of the door closing apparatus is cancelled. A load exerted on the engaging pin of the passive lever can be made smaller than a load exerted on the pressing portion by how to set a lever ratio of the passive lever, thereby making it possible to reduce the rotational torque of the cancelling lever required to rotate the cancelling lever to be disengaged from the engaging pin. Due to this, the door opening operation of the outside handle that rotates the cancelling lever becomes light or needs little effort.

However, the passive lever in which supporting of the engaging pin by the cancelling lever is cancelled rotates relative to the active lever that continues to be rotated by the motor and operates separately from the active lever. Due to this, when the motor is rotated reversely to return the active lever to its initial position, the passive lever needs to be returned to its initial position relative to the active lever. This involves an additional configuration to restore the passive lever to its initial position, causing concerns that the door closing apparatus becomes complex and that the certainty in operation of the door closing apparatus is reduced.

The invention has been made in view of the situations described above, and an object thereof is to provide a door closing apparatus that can make a cancelling operation of a closing operation light or effortless and that can perform a closing operation and a cancellation thereof in an ensured fashion.

Solution to Problem

A door closing apparatus of one aspect of the present invention includes: a latching mechanism provided on a vehicle door and configured to be brought into engagement with a striker, which is provided on a vehicle body, to hold the vehicle door in a half closed state and a fully closed state; a closing mechanism configured to be linked with the latching mechanism to shift the latching mechanism from a half latching state where the vehicle door is held in the half closed state to a fully latching state where the vehicle door is held in the fully closed state; and a driving source configured to operate the closing mechanism, wherein the closing mechanism includes: a driving member configured to be rotated by power of the driving source; a linking member coupled to the driving member relatively rotatably and configured to be translated in response to a rotation of the driving member to be linked with the latching mechanism; and a releasing member configured to rotate in response to an operation of a door opening operation source to release a linkage of the linking member with the latching mechanism, wherein the driving member has a shaft portion, which configures a rotational center of the driving member, and which is supported by the releasing member, and wherein a state where the shaft portion is supported by the releasing member is cancelled by a rotation of the releasing member in response to an operation of the door opening operation source.

Advantageous Effect of the Invention

According to the invention, it is possible to provide the door closing apparatus that can make the cancelling operation of the closing operation light or effortless and that can perform the closing operation and the cancellation thereof in the ensured fashion.

BRIEF DESCRIPTION OF DRAWINGS

FIG. 1 is a perspective view of an example of a vehicle that installs a door closing apparatus to describe an embodiment of the invention.

FIG. 2 is a front view of a vehicle door shown in FIG. 1.

FIG. 3 is a perspective view of a door locking unit of the door closing apparatus shown in FIG. 1.

FIG. 4 is a perspective view of the door locking unit shown in FIG. 3.

FIG. 5 is an exploded perspective view of a latching mechanism and an opening mechanism of the door locking unit shown in FIG. 3.

FIG. 6 is a front view of the latching mechanism and the opening mechanism that are shown in FIG. 5.

FIG. 7 is a side view of the latching mechanism and the opening mechanism that are shown in FIG. 5.

FIG. 8 is a schematic view showing an operation of the latching mechanism shown in FIG. 5.

FIG. 9 is a schematic view showing an operation of the latching mechanism shown in FIG. 5.

FIG. 10 is a schematic view showing an operation of the latching mechanism shown in FIG. 5.

FIG. 11 is a schematic view showing an operation of the opening mechanism shown in FIG. 5.

FIG. 12 is a schematic view showing an operation of the opening mechanism shown in FIG. 5.

FIG. 13 is an exploded perspective view of a locking mechanism of the door locking unit shown in FIG. 3.

FIG. 14 is a schematic view showing an operation of the locking mechanism shown in FIG. 13.

FIG. 15 is a schematic view showing an operation of the locking mechanism shown in FIG. 13.

FIG. 16 is a schematic view showing an operation of the locking mechanism shown in FIG. 13.

FIG. 17 is a schematic view showing an operation of the locking mechanism shown in FIG. 13.

FIG. 18 is a schematic view showing an operation of the locking mechanism shown in FIG. 13.

FIG. 19 is an exploded perspective view of a closing mechanism of the door locking unit shown in FIG. 3.

FIG. 20 is a front view of the closing mechanism shown in FIG. 19.

FIG. 21 is a schematic view showing a closing operation of the closing mechanism shown in FIG. 19.

FIG. 22 is a schematic view showing a closing operation of the closing mechanism shown in FIG. 19.

FIG. 23 is a schematic view showing a closing operation of the closing mechanism shown in FIG. 19.

FIG. 24 is a schematic view showing a closing operation of the closing mechanism shown in FIG. 19.

FIG. 25 is a schematic view showing an operation of the closing mechanism shown in FIG. 19 when the closing operation is cancelled.

FIG. 26 is a schematic view showing an operation of the closing mechanism shown in FIG. 19 when the closing operation is cancelled.

FIG. 27 is a schematic view showing an operation of the closing mechanism shown in FIG. 19 when the closing operation is cancelled.

DESCRIPTION OF EMBODIMENTS

FIG. 1 is a perspective view of an example of a vehicle that installs a door closing apparatus to describe an embodiment of the invention.

A vehicle shown in FIG. 1 is a motor vehicle of a four-door sedan type including four side doors 1 that are opened and closed in a vehicle's width direction. Although only a door closing apparatus 2 provided on a side door 1 on a driver's seat side is shown in FIG. 1, the door closing apparatus 2 is provided on each of the four side doors 1.

The door closing apparatus 2 is made up of a door locking unit 3 and a driving unit 4, and the door locking unit 3 and the driving unit 4 are disposed in an interior portion of the side door 1.

The door locking unit 3 includes a latching mechanism configured to mesh with a striker 5 provided on a vehicle body to hold the side door 1 in a half closed state and a fully closed state and a closing mechanism that is linked with the latching mechanism to shift the latching mechanism from a half latching state where the latching mechanism holds the side door 1 in the half closed state to a fully latching state where the latching mechanism holds the side door 1 in the fully closed state.

Further, the door locking unit 3 includes an opening mechanism configured to release the holding of the side door 1 in the half closed state and the fully closed state by the latching mechanism to thereby enable the side door 1 to be opened and a locking mechanism configured to nullify an opening operation of the opening mechanism that is configured to enable the side door 1 to be opened.

The driving unit 4 includes a driving source for activating to operate the closing mechanism of the door locking unit 3.

FIG. 2 indicates a configuration of the side door.

The side door 1 includes an inner panel 10 and an outer panel 11.

An inner handle 12 is provided on the inner panel 10 as a door opening operation source that is operated to open the side door 1. Additionally, a lock knob 13 is provided on the inner panel 10 as a locking and unlocking operation source of a locking operation of locking the side door 1 so as not to be opened and an unlocking operation of unlocking the side door 1.

An outer handle 14 (refer to FIG. 1) is provided on the outer panel 11 as a door opening operation source that is operated to open the side door 1. Additionally, a key cylinder 15 (refer to FIG. 1) is provided on the outer panel 11 as a locking and unlocking operation source of a locking operation of locking the side door 1 so as not to be opened and an unlocking operation of unlocking the side door 1.

The door locking unit 3 and the driving unit 4 are disposed in an interior portion of the side door 1 that is defined between the inner panel 10 and the outer panel 11 and are fixed to the inner panel 10. A part installation opening 16 is provided in the inner panel 10, and this part installation opening 16 communicates with the interior portion of the side door 1, so that the door locking unit 3 and the driving unit 4 are inserted into the interior portion of the side door 1 through the part installation opening 16.

The door locking unit 3 is placed out of the part installation opening 16 in the interior portion of the side door 1. The driving unit 4 is also placed out of the part installation opening 16 in the interior portion of the side door 1. The driving unit 4 including a driving source such as a motor is placed out of the part installation opening 16 and is covered with the inner panel 10, whereby the quietness inside a passenger compartment is enhanced. The part installation opening 16 is closed by an appropriate lid member, not shown, after the door locking unit 3, the driving unit 4 and other parts are placed in the interior portion of the side door 1.

Power of the driving unit 4 is transmitted to the closing mechanism of the door locking unit 3 by way of a cable 20. A door opening operation of the inner handle 12 is transmitted to the opening mechanism of the door locking unit 3 by way of a cable 21, and locking and unlocking operations of the lock knob 13 are transmitted to the locking mechanism of the door locking unit 3 by way of a cable 22. Additionally, a door opening operation of the outer handle 14 is transmitted to the opening mechanism of the door locking unit 3 by way of a cable 23. Locking and unlocking operations of the key cylinder 15 are transmitted to the locking mechanism of the door locking unit 3 by way of a key link 24 (refer to FIG. 3).

FIGS. 3 and 4 show a configuration of the door locking unit 3. It should be noted that with the door locking unit 3 placed as required in the interior portion of the side door 1, a vehicle's height direction is referred to as an up and down or vertical direction of the door locking unit 3.

The door locking unit 3 is briefly configured so that various parts that make up the latching mechanism, the opening mechanism, the locking mechanism, and the closing mechanism are assembled to a metallic cover plate 30 and a metallic base plate 31, as well as a resin case 32 and a resin body 33 that are assembled to the cover plate 30 and the base plate 31 and that these parts are covered by a metallic or resin cover. A striker entrance groove 35 is provided in the cover plate 30 so that the striker 5 enters it as the side door 1 is closed.

Hereinafter, the latching mechanism, the opening mechanism, the locking mechanism and the closing mechanism of the door locking unit 3 will sequentially be described.

FIGS. 5 to 7 show configurations of the latching mechanism and the opening mechanism of the door locking unit 3.

Firstly, the latching mechanism will be described. The latching mechanism includes a latch 40 and a ratchet 50.

The latch 40 is supported rotatably by a latch shaft 42. The latch 40 has a striker engaging groove 43 that can receive the striker 5 therein, and an entrance to the striker engaging groove 43 can rotate from a releasing position P1 (refer to FIG. 8), which is superposed on the striker entrance groove 35, to a fully latching position P3 (refer to FIG. 10) by way of a half latching position P2 (refer to FIG. 9). The latch 40 is biased towards the releasing position P1 by a torsion spring 44.

The ratchet 50 is supported rotatably by a ratchet shaft 51. The ratchet 50 has an engaging portion 52 that contacts and slides on an outer circumference of the latch 40 and an abutment portion 53 that is pressed against by the opening mechanism, which will be described later. The ratchet 50 is biased in a direction in which the outer circumference of the latch 40 and the engaging portion 52 are kept in contact with each other by a torsion spring 54.

A half latching engaging portion 45 and a fully latching engaging portion 46 are provided on the outer circumferential surface of the latch 40 as engaging portions with the engaging portion 52.

Operations of the latching mechanism are shown in FIGS. 8 to 10. In the description, the side door 1 is understood to be opened.

As shown in FIG. 8, the latch 40 stays in the releasing position P1, and the striker 5 enters the striker entrance groove 35 in the cover plate 30 as the side door 1 is closed. When entering the striker entrance groove 35, the striker 5 is received in the striker engaging groove 43 in the latch 40 and is brought into abutment with a lateral surface of the striker engaging groove 43. Then, the latch 40 is pressed by the striker 5 and rotates from the releasing position P1 towards the half latching position P2 and further the fully latching position P3.

FIG. 9 shows the latching mechanism that stays in a half latching state where the side door 1 is held half closed. When the latch 40 is shifted to the half latching position P2, the half latching engaging portion 45 of the latch 40 is brought into engagement with the engaging portion 52 of the ratchet 50, whereby the latch 40 is prevented from rotating back to the releasing position P1.

FIG. 10 shows the latching mechanism that stays in a fully latching state where the side door 1 is held fully closed. In this fully latching state, the fully latching engaging portion 46 of the latch 40 is brought into engagement with the engaging portion 52 of the ratchet 50, whereby the latch 40 is prevented from rotating back to the releasing position P1.

In the half latching state shown in FIG. 9, the engagement of the half latching engaging portion 45 with the engaging portion 52 is released. In the fully latching state shown in FIG. 10, the engagement of the fully latching engaging portion 46 with the engaging portion 52 is released. Due to this, the striker 5 can then be released from the striker entrance groove 35 as the latch 40 rotates towards the releasing position P1, whereby the side door 1 can be opened.

Next, referring again to FIGS. 5 to 7, the opening mechanism will be described. The opening mechanism includes an opening link 61, an inner handle lever 70 (hereinafter, referred to as an IH lever), and a first outer handle lever 80 (hereinafter, referred to as a first OH lever).

The opening link 61 has a pressing portion 62 that presses the abutment portion 53 of the ratchet 50 and is supported by a second outer handle lever 63 (hereinafter, referred to as a second OH lever).

The second OH lever 63 is disposed below the ratchet 50 and is supported rotatably by a second OH lever shaft 64 that is provided on the cover plate 30. The second OH lever 63 has a supporting portion 65 that supports the opening link 61, and the opening link 61 that is supported by the supporting portion 65 is disposed below the abutment portion 53. Then, the opening link 61 can shift in the vertical direction as the second OH lever 63 rotates. The second OH lever 63 is biased in a direction in which the opening link 61 is shifted downwards by a torsion spring 68.

Further, the supporting portion 65 supports the opening link 61 rotatably, and the opening link 61 that is supported by the supporting portion 65 can rotate between an unlocking position P4 (refer to FIGS. 9, 10) where the pressing portion 62 is disposed to face the abutment portion 53 and a locking position P5 (refer to FIGS. 14, 15, 16) where the pressing portion 62 is disposed out of the abutment portion 53. The opening link 61 is biased towards the unlocking position P4 by a torsion spring 69.

The IH lever 70 is disposed further downwards than the opening link 61 and is supported rotatably by an IH lever shaft, not shown, that is provided on the case 32 (refer to FIG. 4). The cable 21, which transmits a door opening operation of the inner handle 12 (refer to FIG. 2), is connected to the IH lever 70. The 1H lever 70 is pulled to rotate by the cable 21 as the inner handle 12 is operated to open the side door 1. The IH lever 70 is biased by a torsion spring 72 in an opposite direction to the direction in which the IH lever 70 is pulled to rotate by the cable 21.

The lever 70 has a pressing portion 73 that is disposed below the opening link 61. The pressing portion 73 shifts in the vertical direction as the lever 70 rotates and shifts upwards when the lever 70 is pulled by the cable 21 as the inner handle 12 is operated to open the side door 1.

The first OH lever 80 is provided adjacent to the second OH lever 63 substantially in the same vertical position as that of the second OH lever 63 and is supported rotatably by a first OH lever shaft, not shown, that is provided on the body 33 (refer to FIG. 4). The cable 23, which transmits a door opening operation of the outer handle 14 (refer to FIG. 2), is connected to the first OH lever 80, so that the first OH lever 80 is pulled to rotate by the cable 23 as the outer handle 14 is operated to open the side door 1.

An abutment portion 66 is provided on the second OH lever 63 in an opposite position to a position where the supporting portion 65 is provided across the second OH lever shaft 64. The first OH lever 80 has a pressing portion 82 disposed above the abutment portion 66. The pressing portion 82 shifts in the vertical direction as the first OH lever 80 rotates and shifts downwards when the first OH lever 80 is pulled to rotate by the cable 23 as the outer handle 14 is operated to open the side door 1.

FIGS. 11 and 12 show operations of the opening mechanism. In the following description, it should be understood that the latching mechanism stays in the fully latching state, the opening link 61 stays in the unlocking position P4, and the pressing portion 62 of the opening link 61 is disposed to face the abutment portion 53 of the ratchet 50.

FIG. 11 shows an operation of the opening mechanism when the inner handle 12 is operated to open the side door 1. In this state, the IH lever 70 is pulled to rotate by the cable 21 as the inner handle 12 is operated to open the side door 1, and the pressing portion 73 shifts upwards as the IH lever 70 rotates. When shifting upwards, the pressing portion 73 is brought into abutment with the opening link 61 to push the opening link 61 upwards.

When the opening link 61 staying in the unlocking position P4 is pushed upwards, the pressing portion 62 is brought into abutment with the abutment portion 53 to thereby push up the abutment portion 53. When pushed up, the abutment portion 53 rotates the ratchet 50, whereby the engaging portion 52 situated opposite to the abutment portion 53 across the ratchet shaft 51 is shifted downwards. This causes the engaging portion 52 to move away from the outer circumferential portion of the latch 40, whereby the engagement of the fully latching engaging portion 46 with the engaging portion 52 is released. When the engagement of the fully latching engaging portion 46 with the engaging portion 52 is released, the latch 40 is allowed to rotate towards the releasing position P1.

FIG. 12 shows an operation of the opening mechanism when the outer handle 14 is operated to open the side door 1. As the outer handle 14 is operated to open the side door 1, the first OH lever 80 is pulled to rotate by the cable 23, whereby the pressing portion 82 shifts downwards as the first OH lever 80 rotates.

When shifting downwards, the pressing portion 82 is brought into abutment with the abutment portion 66 of the second OH lever 63 to push the abutment portion 66 downwards. When the abutment portion 66 is pushed downwards, the supporting portion 65, which is situated at the opposite side to the side where the abutment portion 66 is provided across the second OH lever shaft 64, shifts upwards, and this pushes up the opening link 61 that is supported on the supporting portion 65.

When the opening link 61 staying in the unlocking position P4 is pushed up, the pressing portion 62 is brought into abutment with the abutment portion 53 to push up the abutment portion 53. The ratchet 50 is rotated as a result of the abutment portion 53 being pushed up, the engaging portion 52 is shifted downwards, whereby the engagement of the fully latching engaging portion 46 with the engaging portion 52 is released. When the engagement of the fully latching engaging portion 46 with the engaging portion 52 is released, the latch 40 is allowed to rotate towards the releasing position P1.

Here, although the opening link 61 is pushed up in association with the operation of the opening mechanism based on the door opening operation of the inner handle 12 shown in FIG. 11 and the operation of the opening mechanism based on the door opening operation of the outer handle 14 shown in FIG. 12, the inner handle 12 and the outer handle 14 are kept independent from each other, and hence, the door opening operation of one handle is not interlocked with the door opening operation of the other handle.

In the operation of the opening mechanism based on the door opening operation of the inner handle 12 shown in FIG. 11, when the opening link 61 is pushed up by the IH lever 70, the second OH lever 63 that supports the opening link 61 is also rotated, while the abutment portion 66 of the second OH lever 63 moves away from the pressing portion 82 of the first OH lever 80 to shift downwards alone, whereby the first OH lever 80 is held in a stationary state. Thus, the outer handle 14 is not interlocked with the opening operation of the inner handle 12 and is held in a stationary state.

In the operation of the opening mechanism based on the door opening operation of the outer handle 14 shown in FIG. 12, when the opening link 61 is pushed up via the second OH lever 63 by the first OH lever 80, the opening link 61 moves away from the pressing portion 73 of the first IH lever 70 to shift upwards alone, whereby the IH lever 70 is held in a stationary state. Thus, the inner handle 12 is not interlocked with the door opening operation of the outer handle 14 and is held in a stationary state.

Then, due to the second OH lever 63 being interposed between the first OH lever 80 and the opening link 61, the outer handle 14 and the first OH lever 80 are coupled together by the cable 23, whereby the first OH lever 80 can be driven as a result of being pulled by way of the cable 23.

In the description of the operations of the opening mechanism described above, the latching mechanism is described as staying in the fully latching state, however, the opening mechanism operates in the same way also when the latching mechanism stays in the half latching state.

Next, the locking mechanism will be described.

FIG. 13 shows the configuration of the locking mechanism.

The locking mechanism includes a locking lever 90, a motor 100, a worm gear 101 and a worm wheel 102, and a key slider 110.

The locking lever 90 is supported rotatably by a locking lever shaft, not shown, that is provided on the case 32. The locking lever 90 has a guiding portion 92 that is brought into engagement with the opening link 61. The guiding portion 92 is made up of an elongated projection that is provided on a back surface of the locking lever 90 that faces the opening link 61 so as to extend in the vertical direction. In the opening operation of the opening mechanism described above, the opening link 61 slides on a lateral surface of the guiding portion 92 to shift in the vertical direction.

Then, the opening link 61 that is left in engagement with the guiding portion 92 is rotated as the locking lever 90 rotates, and the locking lever 90 is rotated by the cable 22 that transmits locking and unlocking operations of the lock knob 13 (refer to FIG. 2), the motor 100, the worm gear 101 and the worm wheel 102, and the key slider 110 to which locking and unlocking operations of the key cylinder 15 (refer to FIG. 2) are transmitted.

FIG. 14 shows a case where the locking lever 90 is rotated by the cable 22 that transmits locking and unlocking operations of the lock knob 13. The cable 22 is connected to the locking lever 90, and the locking lever 90 is rotated by the cable 22 in response to a locking operation of the lock knob 13. When the locking lever 90 is rotated by the cable 22, the opening link 61 that is in engagement with the guiding portion 92 rotates from the unlocking position P4 (refer to FIGS. 9, 10) towards the locking position P5.

The locking lever 90 rotates between an unset position (a position indicated by a chain double-dashed line in FIG. 14) where the opening link 61 is disposed in the unlocking position P4 and a set position (a position indicated by a solid line in FIG. 14) where the opening link 61 is disposed in the locking position P5 and is held in these positions by a torsion spring 93 (refer to FIG. 13) that reverses its biasing direction as the locking lever 90 rotates.

FIG. 15 shows a case where the locking lever 90 is rotated by the motor 100 with the worm gear 101 and the worm wheel 102. A cam follower 94 is provided on the locking lever 90 so as to be brought into engagement with a cam 103 that is provided on a lateral surface of the worm wheel 102 so as to project therefrom. When the motor 100 is driven to rotate forwards, the worm wheel 102 is caused to rotate via the worm gear 101, and the cam 103 is brought into engagement with the cam follower 94 as the worm wheel 102 rotates, whereby the locking lever 90 is caused to rotate. This causes the opening link 61 to rotate towards the locking position P5.

FIG. 16 shows a case where the locking lever 90 is rotated by the key slider 110 to which locking and unlocking operations of the key cylinder 15 are transmitted. A knocking pin 95 (refer to FIG. 13) is provided on the locking lever 90, and this knocking pin 95 is accommodated in an engaging hole 111 that is provided in the key slider 110. When a locking operation is performed at the key cylinder 15, the key slider 110 shifts upwards, and this pushes up the knocking pin 95 accommodated in the engaging hole 111, whereby the locking lever 90 is rotated. This causes the opening link 61 to rotate towards the locking position P5.

On the understanding that the locking lever 90 is rotated by any one of the cable 22, the motor 100 with the worm gear 101 and the worm wheel 102, and the key slider 110, causing the opening link 61 to shift to the locking position P5, as shown in FIG. 17, when the inner handle 12 is operated to open the side door 1, although the opening link 61 is pushed up by the IH lever 70, since the pressing portion 62 of the opening link 61 that stays in the locking position P5 is disposed out of the abutment portion 53 of the ratchet 50, the pressing portion 62 idly pass the abutment portion 53 to fail to come into contact with the abutment portion 53, whereby the engagement of the fully latching engaging portion 46 of the latch 40 with the engaging portion 52 of the ratchet 50 is maintained.

An unlocking operating portion 74 of the IH lever 70 is brought into abutment with a portion of the locking lever 90 after the abutment of the pressing portion 62 with the abutment portion 53 is missed, causing the locking lever 90 to rotate towards the unset position. When the inner handle 12 is once returned, the locking lever 90 is biased by the torsion spring 93 to be held in the unset position, whereby the opening link 61 is disposed in the unlocking position P4. Thereafter, when the inner handle 12 is operated to open the side door 1 again, the engagement of the fully latching engaging portion 46 with the engaging portion 52 is released.

Similarly, on the understanding that the opening link 61 has shifted to the locking position P5, as shown in FIG. 18, when the outer handle 14 is operated to open the side door 1, although the opening link 61 is pushed up by the first OH lever 80, the abutment of the pressing portion 62 with the abutment portion 53 is missed, whereby the engagement of the fully latching engaging portion 46 of the latch 40 with the engaging portion 52 of the ratchet 50 is maintained.

Next, the closing mechanism will be described.

FIGS. 19 and 20 show the configuration of the closing mechanism.

The closing mechanism includes a closing lever 120 as a driving member that is rotated by the power of the driving unit 4 (refer to FIG. 1), a closing arm 130 as a link member that links with the latching mechanism, and a cancelling lever 140 as a releasing member for releasing an engagement of the closing arm 130 with the latching mechanism.

The cancelling lever 140 has a supporting portion 141 that is configured to support a closing lever shaft 121. The closing lever shaft 121 configures a rotational center of the closing lever 120. The cancelling lever 140 is disposed below the second OH lever 63. The closing lever 120 is supported rotatably on the supporting portion 141 so as to be rotatable around the closing lever shaft 121.

The closing lever 120 has an engaging pin 122 into which the power of the driving unit 4 is inputted and a coupling shaft 123 to which the closing arm 130 is rotatably coupled relatively. The engaging pin 122 and the coupling shaft 123 are disposed opposite to each other across the closing lever shaft 121. The power of the driving unit 4 is inputted into the engaging pin 122 via a closing link 150.

The closing link 150 is supported rotatable on the base plate 31 by a closing link shaft 151. The cable 20, which is configured to transmit the power of the driving unit 4, is connected to the closing link 150, whereby the closing link 150 is pulled to rotate by the cable 20 as the driving unit 4 operates.

The closing link 150 has an engaging pin 152. The engaging pin 152 shifts in the vertical direction as the closing link 150 rotates and shifts downwards when the closing link 150 is pulled to rotate by the cable 20 as the driving unit 4 operates. When shifting downwards, the engaging pin 152 comes into abutment with the engaging pin 122 of the closing lever 120 to thereby push the engaging pin 122 downwards.

The coupling shaft 123, which is disposed opposite to the engaging pin 122 across the closing lever shaft 121, shifts upwards on the contrary to the engaging pin 122 as the engaging pin 122 is pushed downwards. The closing lever 120 is biased in a direction in which the engaging pin 122 shifts upwards and the coupling shaft 123 shifts downwards by a torsion spring 124.

The closing arm 130 is coupled to the closing lever 120 so as to rotate relatively by way of the coupling shaft 123 and is placed so as to extend upwards from the coupling shaft 123. The closing arm 130 is supported between the cover plate 30 and the body 33 (refer to FIG. 4) so as to be translated in the vertical direction that intersects a direction in which the striker 5 enters the striker entrance groove 35.

A linking portion 131 is provided at an upper end portion of the closing arm 130. The coupling shaft 123 shifts upwards as a result of a rotation of the closing lever 120, and the closing arm 130 shifts upwards as the coupling shaft 123 so shifts, whereby the linking portion 131 comes to link with the latch 40. A linking portion 47 is provided on the outer circumferential portion of the latch 40 so as to link with the linking portion 131.

Further, a supporting arm 160 is coupled to the closing lever 120 so as to rotate relatively via the coupling shaft 123. This supporting arm 160 can also rotate relative to the closing arm 130 that is coupled to the closing lever 120 via the coupling shaft 123.

The supporting arm 160 is supported rotatably on the cover plate 30 so as to be rotatable around a support arm shaft 161. The supporting arm shaft 161 is disposed on an axis of the closing lever shaft 121 that is supported by the supporting portion 141 of the cancelling lever 140. When the coupling shaft 123 shifts upwards as a result of a rotation of the closing lever 120 and the closing arm 130 shifts upwards as the coupling shaft 123 shifts so upwards, the supporting arm 161 rotates together with the closing lever 120. The supporting arm 160 is biased in a direction in which the coupling shaft 123 shifts downwards by a coil spring 162. A supporting portion 36 is provided on the cover plate 30 so as to be brought into abutment with the coupling shaft 123 that is caused to shift downwards by the supporting arm 160 to support the coupling shaft 123.

FIGS. 21 to 24 show closing operations of the closing mechanism. The side door 1 is understood to be opened.

In a state shown in FIG. 21, the latch 40 stays in the releasing position P1, and the entrance to the striker engaging groove 43 of the latch 40 is superposed on the striker entrance groove 35 of the cover plate 30. In addition, the engaging portion 52 of the ratchet 50 is in engagement with neither the half latching engaging portion 45 nor the fully latching engaging portion 46 of the latch 40.

A latch switch 170 detects a rotation of the latch 40. The latch switch 170 is kept on immediately before the latch 40 arrives at the fully latching position P3 by way of the half latching position P2 after it has started rotating from the releasing position P1 and is switched off when the latch 40 has arrived at the fully latching position P3.

A ratchet switch 171 detects similarly a rotation of the ratchet 50. The ratchet switch 171 is switched on when the engaging portion 52 is in engagement with the half latching engaging portion 45 or the fully latching engaging portion 46 and is switched off when the engagement of the engaging portion 52 with the half latching engaging portion 45 or the fully latching engaging portion 46 is released.

As shown in FIG. 22, the striker 5 enters the striker entrance groove 35 in the cover plate 30 as the side door 1 is closed, and the latch 40 that is pressed by the striker 5 then rotates towards the half latching position P2. Then, the half latching engaging portion 45 and the engaging portion 52 are brought into engagement with each other at a point in time when the latch 40 shifts to the half latching position P2. When the closure of the side door 1 is interrupted at this point in time, a control unit, not shown, of the door closing apparatus resumes the closing operation of the closing mechanism.

The latch switch 170 is kept on due to the latch 40 staying in the half latching position P2, and the ratchet switch 171 is also kept on due to the half latching engaging portion 45 being in engagement with the engaging portion 52. The control unit detects that the latch 40 stays in the half latching position P2 and the latching mechanism stays in the half latching state based on the fact that both the latch switch 170 and the ratchet switch 171 remain switched on, and the control unit activates the driving unit 4 to operate.

As shown in FIG. 23, the closing link 150 is pulled to rotate by the cable response to an operation of the driving unit 4, and the engaging pin 152 of the closing link 150 shifts downwards. When shifting downwards, the engaging pin 152 comes into abutment with the engaging pin 122 of the closing lever 120 to thereby push down the engaging pin 122. The closing lever shaft 121 of the closing lever 120 is supported by the supporting portion 141 of the cancelling lever 140. The coupling shaft 123 of the closing lever 120 that is situated at the opposite side to the engaging pin 122 across the closing lever shaft 121 shifts upwards as the engaging pin 122 is pushed down, whereby the closing arm 130 shifts upwards as the coupling shaft 123 shifts upwards.

As the closing arm 130 shifts upwards, the linking portion 131 of the closing arm 130 comes into abutment with the linking portion 47 of the latch 40, whereby the linking portion 47 is pushed up. The latch 40 rotates towards the fully latching position P3 as the linking portion 47 is pushed up. Then, as the latch 40 rotates towards the fully latching position P3, the striker 5 is pressed by the latch 40 to be pushed into a deep position in the striker entrance groove 35, and as this occurs, the side door 1 is closed relatively.

As shown in FIG. 24, the fully latching engaging portion 46 comes into engagement with the engaging portion 52 at a point in time when the latch 40 has shifted to the fully latching position P3. The latch switch 170 is switched off due to the latch 40 staying in the fully latching position P3, whereas the ratchet switch 171 is switched on due to the fully latching engaging portion 46 being in engagement with the engaging portion 52. The control unit detects that the latching mechanism has shifted to the fully latching state based on the fact that the latch switch 170 is off whereas the ratchet switch 171 is on. Then, when detecting that the latching mechanism is in the fully latching state, the control unit stops the driving unit 4 and thereafter activates the driving unit 4 to operate reversely.

The pulling of the closing link 150 by the cable 20 is released as the driving unit 4 operates reversely, and the closing lever 120 biased by the torsion spring 124 and the supporting arm 160 biased by the coil spring 162 are restored to their initial positions shown in FIG. 21. Together with this, the closing arm 130 is also restored to its initial position shown in FIG. 21. Thus, the closing mechanism completes the closing operation.

Next, referring to FIGS. 19 and 20 again, a configuration of the closing mechanism to cancel the closing operation will be described.

The cancelling lever 140 is supported rotatably on the cover plate 30 by a cancelling lever shaft 142 and can rotate between an active position P6 (refer to FIG. 21) where the supporting portion 141 is disposed directly below the closing lever shaft 121 and a cancelling position P7 (refer to FIG. 26) where the supporting portion 141 is disposed out of the position situated directly below the closing lever shaft 121. The cancelling lever 140 is biased towards the active position P6 by a coil spring 143.

The cancelling lever 140 has an abutment portion 144. The second OH lever 63 has provided thereon a pressing portion 67 that can be brought into abutment with the abutment portion 144. The pressing portion 67 is brought into abutment with the abutment portion 144 as the second OH lever 63 rotates during the opening operation of the opening mechanism described above, whereby the cancelling lever 140 is rotated towards the cancelling position P7.

FIGS. 25 to 27 show operations of the closing mechanism when the closing operation is cancelled. It should be noted that the description will be made based on the understanding that the control unit activates the driving unit 4 to operate when the control unit detects that the latching mechanism has shifted to the half latching state.

As shown in FIG. 23, when the closing arm 130 shifts upwards in response to the operation of the driving unit 4, the linking portion 131 of the closing arm 130 is brought into abutment with the linking portion 47 of the latch 40, whereby the linking portion 47 is pushed up. Although the latch 40 rotates from the half latching position P2 towards the fully latching position P3 as the linking portion 47 is pushed up as described above, a door opening operation to open the side door 1 is performed at a timing prior to an arrival of the latch 40 at the fully latching position P3, whereby the closing operation is cancelled. In this example, it is understood that the door opening operation is performed through the outer handle 14 that is one of the sources that activate the door opening operation of the side door 1.

As shown in FIG. 25, when the first OH lever 80 is pulled to rotate by the cable 23 in response to a door opening operation via the outer handle 14, the second OH lever 63 also rotates in response to the rotation of the first OH lever 80 as one of the series of opening operations of the opening mechanism described above. The pressing portion 67 is brought into abutment with the abutment portion 144 as the second OH lever 63 so rotates, causing the cancelling lever 140 to rotate from the active position P6 towards the cancelling position P7.

A second OH lever switch 172 detects the rotation of the second OH lever 63. The second OH lever switch 172 is switched on when the second OH lever 63 stays in its initial position shown in FIG. 21, while the second. OH lever switch 172 is switched off when the second OH lever 63 rotates.

As shown in FIG. 26, the supporting of the closing lever shaft 121 by the supporting portion 141 is released at a point in time when the cancelling lever 140 has shifted to the cancelling position P7. The closing lever 120 that has lost the supporting by the closing lever shaft 121 and the closing arm 130 that is coupled to the closing lever 120 via the coupling shaft 123 are pulled down altogether by the supporting arm 160 that is biased in a direction in which the coupling shaft 123 shifts downwards.

The linking portion 131 of the closing arm 130 moves away from the linking portion 47 of the latch 40 as the closing arm 130 is pulled downwards. Then, the closing lever 120 that is pulled downwards by the supporting arm 160 rotates thereafter about the coupling shaft 123, as a rotational center, that is supported by the supporting portion 36 of the cover plate 30 as the engaging pin 122 is pressed downwards. Due to this, the coupling shaft 123 never shifts upwards even though the engaging pin 122 is pushed downwards, and the closing arm 130 also never shifts upwards.

Thus, the linking portion 131 of the closing arm 130 is kept apart from the linking portion 47 of the latch 40, and the latch 40 is stopped rotating towards the fully latching position P3, whereby the closing operation of the closing mechanism is cancelled. At the same time, the engagement of the half latching engaging portion 45 with the engaging portion 52 has already been released by the aforesaid opening operation of the opening mechanism based on the door opening operation by the outer handle 14, whereby the side door 1 can be opened.

As shown in FIG. 27, when the outer handle 14 is released from the door opening operation, the pulling of the first OH lever 80 by the cable 23 is released, and the second OH lever 63 that is biased by the torsion spring 68 is restored to its initial position shown in FIG. 21, whereby the second OH lever switch 172 is switched from being off state to being on. Then, the control unit detects that the closing operation of the closing mechanism is cancelled based on the fact that the second OH lever switch 172 is switched from being off to being on after the closing operation of the closing mechanism is started. Then, the control unit stops the driving unit 4 as a result of the control unit having detected that the closing operation is cancelled, thereafter the driving unit 4 is activated again to operate reversely.

The pulling of the closing link 150 by the cable 20 is released in response to the reverse operation of the driving unit 4, and the closing lever 120 that is biased by the torsion spring 124 and the cancelling lever 140 that is biased by the coil spring 143 are both restored to their initial positions shown in FIG. 21. As the closing lever 120 and the cancelling lever 140 are restored to their initial positions, the closing lever shaft 121 is lifted up and is then supported again by the supporting portion 141 of the cancelling lever 140. This completes the closing operation of the closing mechanism when the closing operation is cancelled.

The cancellation of the closing operation of the closing mechanism has been described heretofore based on the understanding that the side door 1 is opened using the outer handle 14 that is one of the sources that activate the door opening operation. However, also when the side door 1 is opened using the inner handle 12 that configures another source of activation of the door opening operation, the second OH lever 63 rotates similarly, and the closing operation of the closing mechanism is cancelled similarly.

In the door closing apparatus 2 that has been described heretofore, in place of a configuration in which the linkage of the closing arm 130 with the latch 40 is released from the latch 40 by shifting the closing arm 130 upwards to rotate, the configuration is adopted in which the supporting of the closing lever shaft 121 of the closing lever 120 that shifts the closing arm 130 upwards by the cancelling lever 140 is cancelled by rotating the cancelling lever 140 that supports the closing lever 120, whereby the closing lever 120 and the closing arm 130 are pulled downwards altogether to cancel the closing operation of the door closing apparatus 2. This can enable the door opening operation performed by the inner handle 12 and the outer handle 14 when cancelling the closing operation to be performed light or with little effort.

Then, to cancel the closing operation, the supporting of the closing lever shaft 121 by the cancelling lever 140 is cancelled to thereby pull the closing lever 120 and the closing arm 130 downwards altogether. This enables the closing lever 120 and the closing arm 130 to be restored to their initial positions only by lifting up the closing lever shaft 121 so that the closing lever shaft 121 is supported by the cancelling lever 140 again. This obviates the necessity of an additional configuration to restore the closing arm 130 and the closing lever 120 to their initial positions, thereby making it possible to simplify the configuration of the door closing apparatus 2 to thereby enhance the certainty in operation of the door closing apparatus 2.

In addition, the coupling shaft 123 that configures the coupling portion where the closing lever 120 and the closing arm 130 are coupled together is supported by the supporting arm 160 that can rotate, whereby the shifting of the closing lever 120 and the closing arm 130 when they are pulled downwards altogether can be controlled by the common supporting arm 160. This makes it possible to simplify the configuration of the door closing apparatus 2 more to thereby enhance the certainty in operation of the door closing apparatus 2 further. Further, the door closing apparatus 2 can be made small in size by disposing the supporting arm shaft 161 on the axis of the closing lever shaft 121 that is supported by the cancelling lever 140.

The closing arm 130 is shifted upwards to be linked with the latch 40, whereas to cancel the closing operation, the closing arm 130 is pulled downwards. This can make the door closing apparatus 2 smaller in size than a case where the closing arm 130 is disengaged from the latch 40 by rotating the closing arm 130.

REFERENCE SIGNS LIST

1 Side door
2 Door closing apparatus
3 Door locking unit
4 Driving unit
5 Striker
10 Inner panel
11 Outer panel
12 Inner handle
13 Lock knob
14 Outer handle
15 Key cylinder
16 Part installation opening
20 Cable
21 Cable
22 Cable
23 Cable
24 Key link
30 Cover plate
31 Base plate
32 Case
33 Body
35 Striker entrance groove
36 Supporting portion
40 Latch
42 Latch shaft
43 Striker engaging groove
44 Torsion spring
45 Half latching engaging portion
46 Fully latching engaging portion
47 Linking portion
50 Ratchet
51 Ratchet shaft
52 Engaging portion
53 Abutment portion
54 Torsion spring
61 Opening link
62 Pressing portion
63 Second outer handle lever
64 Second OH lever shaft
65 Supporting portion
66 Abutment portion
67 Pressing portion
68 Torsion spring
69 Torsion spring
70 Inner handle lever
71 IH lever shaft
72 Torsion spring
73 Pressing portion
80 First outer handle lever
82 Pressing portion
90 Locking lever
92 Guiding portion
93 Torsion spring
94 Cam follower
95 Knocking pin
100 Motor
101 Worm gear
102 Worm wheel
103 Cam
110 Key slider
111 Engaging hole
120 Closing lever (Driving member)
121 Closing lever shaft
122 Engaging pin
123 Coupling shaft (Coupling portion)
124 Torsion spring
130 Closing arm (Linking member)
131 Linking member
140 Cancelling lever (Releasing member)
141 Supporting portion
142 Cancelling lever shaft
143 Coil spring
144 Abutment portion
150 Closing link
151 Closing link shaft
152 Engaging pin
160 Supporting arm (Supporting member)
161 Supporting arm shaft
162 Coil spring
170 Latch switch
171 Ratchet switch
172 Second OH lever switch.

The invention claimed is:

1. A door closing apparatus, comprising:
a latching mechanism provided on a vehicle door and configured to be brought into engagement with a striker, which is provided on a vehicle body, to hold the vehicle door in a half closed state and a fully closed state;
a closing mechanism configured to be linked with the latching mechanism to shift the latching mechanism from a half latching state where the vehicle door is held in the half closed state to a fully latching state where the vehicle door is held in the fully closed state; and
a driving source configured to operate the closing mechanism,
wherein the closing mechanism comprises:
a driving member configured to be rotated by power of the driving source;

a linking member relatively rotatably coupled to the driving member and configured to be translated in response to a rotation of the driving member to be linked with the latching mechanism; and a releasing member configured to rotate in response to an operation of a door opening operation source to release a linkage of the linking member with the latching mechanism, wherein the driving member has a shaft portion, configured to be a rotational center of the driving member, and which is supported by the releasing member, and wherein a state where the shaft portion is supported by the releasing member is cancelled by a rotation of the releasing member in response to the operation of the door opening operation source.

2. The door closing apparatus according to claim 1, further comprising:

a supporting member that is rotatable and is configured to support a coupling portion where the driving member and the linking member are coupled together.

3. The door closing apparatus according to claim 2, wherein the supporting member is rotatable about an axis of the shaft portion that is supported by the releasing member.

4. The door closing apparatus according to claim 1, wherein the driving member and the linking member are configured to be withdrawn from the latching mechanism in a direction, in which the linking member is translated, by the cancellation of the state where the shaft portion is supported by the releasing member.

5. The door closing apparatus according to claim 1, wherein the driving source is disposed in an interior portion of the vehicle door at a position apart from a part installation opening that is provided in an inner panel of the vehicle door, and wherein the driving source is fixed to the inner panel.

\* \* \* \* \*